(12) United States Patent
Zhang et al.

(10) Patent No.: US 11,413,992 B2
(45) Date of Patent: Aug. 16, 2022

(54) CHILD SAFELY SEAT

(71) Applicant: Goodbaby Child Products Co., Ltd., Jiangsu (CN)

(72) Inventors: Youcai Zhang, Jiangsu (CN); Binqing Zhou, Jiangsu (CN); Fuge Huang, Jiangsu (CN)

(73) Assignee: Goodbaby Child Products Co., Ltd., Jiangsu (CN)

( * ) Notice: Subject to any disclaimer, the term of this patent is extended or adjusted under 35 U.S.C. 154(b) by 0 days.

(21) Appl. No.: 17/273,145

(22) PCT Filed: Dec. 7, 2018

(86) PCT No.: PCT/CN2018/119769
§ 371 (c)(1),
(2) Date: Mar. 3, 2021

(87) PCT Pub. No.: WO2020/048032
PCT Pub. Date: Mar. 12, 2020

(65) Prior Publication Data
US 2021/0323450 A1   Oct. 21, 2021

(30) Foreign Application Priority Data
Sep. 4, 2018 (CN) .......................... 201811024985.6

(51) Int. Cl.
*B60N 2/28* (2006.01)

(52) U.S. Cl.
CPC .......... *B60N 2/2812* (2013.01); *B60N 2/2851* (2013.01); *B60N 2/2878* (2013.01); *B60N 2002/2815* (2013.01)

(58) Field of Classification Search
CPC .. B60N 2/2812; B60N 2/2851; B60N 2/2878; B60N 2002/2815
See application file for complete search history.

(56) References Cited

U.S. PATENT DOCUMENTS 6,491,348 B1   12/2002   Kain
7,249,803 B2 *  7/2007   Jane Santamaria .. B60N 2/2812
                                                  297/484
(Continued)

FOREIGN PATENT DOCUMENTS

CN        104742765 A    7/2015
CN        106143226 A    11/2016
(Continued)

OTHER PUBLICATIONS

International Search Report for International Patent Application No. PCT/CN2018/119769, dated May 29, 2019 in 4 pages including English translation.
(Continued)

*Primary Examiner* — Philip F Gabler
(74) *Attorney, Agent, or Firm* — Knobbe, Martens, Olson & Bear, LLP

(57) ABSTRACT

Provided is a child safety seat, comprising a seat body and a five-point safety belt disposed on the seat body, wherein the seat body comprises a housing, the five-point safety belt comprises a safety belt buckle, and the housing is internally provided with a storage slot used for storing the safety belt buckle; the seat body further comprises a head support assembly disposed on the housing in a sliding up and down manner, the head support assembly having a predetermined position; when the safety belt buckle is placed in the storage slot, the head support assembly is allowed to be higher than the predetermined position; according to the child safety seat, the five-point safety belt or a car safety belt can be correspondingly selected for use based on the size of a child, and the height of a head support can be adjusted in a corresponding range.

18 Claims, 20 Drawing Sheets

(56) References Cited

U.S. PATENT DOCUMENTS

| | | | | |
|---|---|---|---|---|
| 8,328,275 | B2* | 12/2012 | Vogt .................... | B60N 2/2851 |
| | | | | 297/216.11 |
| 8,622,476 | B2* | 1/2014 | Karremans .......... | B60N 2/2812 |
| | | | | 297/410 |
| 8,944,503 | B2* | 2/2015 | Gates .................. | B60N 2/2851 |
| | | | | 297/475 |
| 10,124,702 | B2* | 11/2018 | Denbo ................ | B60N 2/2812 |
| 10,266,077 | B2* | 4/2019 | Mason ................ | B60N 2/2851 |
| 10,632,871 | B2* | 4/2020 | Schmitz .............. | B60N 2/818 |
| 10,730,414 | B2* | 8/2020 | Pleiman .............. | B60N 2/2806 |
| 10,894,491 | B2* | 1/2021 | Persson .............. | B60N 2/2812 |

FOREIGN PATENT DOCUMENTS

| | | |
|---|---|---|
| CN | 106314221 A | 1/2017 |
| CN | 107627917 A | 1/2018 |

OTHER PUBLICATIONS

Written Opinion for International Patent Application No. PCT/CN2018/119769, dated May 24, 2019 in 3 pages.

* cited by examiner

CHILD SAFELY SEAT

CROSS REFERENCE TO RELATED APPLICATION(S)

This application is the U.S. National Phase under 35. U.S.C. § 371 of International Application PCT/CN2018/119769, filed Dec. 7, 20018, which claims priority from Chinese Patent Application No. CN 201811024985.6 filed on Sep. 4, 2018, which is incorporated herein by reference in its entirety.

TECHNICAL FIELD OF THE INVENTION

The present disclosure relates to the field of children products, in particular to a child safety seat.

BACKGROUND OF THE INVENTION

Currently, children of different ages and weights have different requirements for the use of child safety seats. When the user is a small child (e.g. weighing less than 18 Kg), the child must be restrained with a five-point safety belt; and when the user is a larger child (e.g. weighing 15-36 kg), it is required to use vehicle belts to restrain children, and five-point safety belts are not allowed. However, in actual use, misuse often occurs, and there will also be a problem that the height of the head support does not correspond.

SUMMARY OF THE INVENTION

For the above problems, the present disclosure is intended to provide a child safety seat, in which the five-point safety belt or a vehicle belt can be correspondingly selected for use based on the size of a child, and the height of a head support can be adjusted in a corresponding range.

To achieve the above purpose, the present disclosure employs the following technical solution:

A child safety seat, comprises a seat body and a five-point safety belt disposed on the seat body, the seat body comprises a housing, the five-point safety belt comprises a safety belt buckle, and the housing is internally provided with a storage slot used for storing the safety belt buckle;

the seat body further comprises a head support assembly disposed on the housing in a sliding up and down manner, and the head support assembly has a predetermined position, when the safety belt buckle is placed in the storage slot, the head support assembly is allowed to be higher than the predetermined position.

In one embodiment, the child safety seat has a first usage state and a second usage state, in the first usage state, the head support assembly is not higher than the predetermined position, and the safety belt buckle is located outside the storage slot all the time to allow the use of the five-point safety belt; or, the safety belt buckle is located outside the storage slot only when the head support assembly is lower than the predetermined position, and the safety belt buckle is able to be put into the storage slot when the head support assembly is located in the predetermined position;

in the second usage state, the safety belt buckle is located in the storage slot, and the head support assembly is higher than the predetermined position.

Preferably, the seat body further comprises a position-limit mechanism for preventing the head support assembly from being higher than the predetermined position and an unlocking member for releasing the position limit of the head support assembly and the position-limit mechanism, and the unlocking member is slidably disposed on the housing and one end of the unlocking member is movably disposed in the storage slot; when the child safety seat is converted from the first usage state to the second usage state, the seat belt buckle enters the storage slot and presses the one end of the unlocking member to release the position limit of the head support assembly and the position-limit mechanism.

More preferably, the unlocking member is disposed on the housing in a sliding up and down manner, and a lower end portion of the unlocking member is movably disposed in the storage slot.

In one preferred embodiment, the head support assembly comprises a head support fixed part, and the head support fixed part is formed with a position-limit face facing upward thereon;

the position-limit mechanism comprises a first lock pin seat disposed on the housing in a sliding left and right manner, the first lock pin seat is provided with a first lock pin cooperating with the position-limit face, and the head support assembly is in the predetermined position when the first lock pin pushes against the position-limit face;

the unlocking member is in a tight contact with the first lock pin seat and at least one of the components is provided with an unlocking slope that contacts and cooperates with the other component, and the unlocking slope gradually is tilted upward or downward from left to right;

when the child safety seat is in the first usage state, the first lock pin is located directly above the position-limit face or pushes against the position-limit face; when the child safety seat is in the second usage state, the first lock pin is located on the left or right side of the position-limit face to disengage from the position-limit face.

Preferably, the head support fixed part is opened with a first guide slot thereon, the first guide slot extends along a up-and-down direction, the position-limit face is formed on a lower wall of the first guide slot, and a left or right wall of the first guide slot is opened with a gap for the first lock pin to go in and out; when the child safety seat is in the first usage state, the first lock pin is slidably inserted in the first guide slot; when the child safety seat is in the second usage state, the first lock pin is located outside the first guide slot.

More preferably, the head support fixed part is further opened with a second guide slot thereon, the second guide slot is in communication with the first guide slot via the gap; when the child safety seat is in the second usage state, the first lock pin is slidably inserted in the second guide slot or located directly under the second guide slot.

Preferably, the position-limit mechanism further comprises a first elastic element disposed between the housing and the first lock pin seat.

In another preferred embodiment, the housing comprises an outer plate cover and an inner plate cover capable of sliding relative to the outer plate cover, the position-limit mechanism comprises a first position-limit portion formed on the inner plate cover and a second position-limit portion formed on the outer plate cover, the first position-limit portion is located directly under the second position-limit portion, and when the head support assembly is in the predetermined position, the first position-limit portion pushes against the second position-limit portion;

the seat body further comprises a second lock pin, the second lock pin is disposed on a second lock pin seat, the unlocking member is in a tight contact with the second lock pin seat and at least one of the components is provided with an unlocking slope that contacts and cooperates with the other component, and the unlocking slope gradually is tilted upward or downward from left to right;

the outer plate cover is provided with an outer locking slot into which the second lock pin is inserted, and the inner plate cover is provided with an inner locking slot into which the second lock pin is inserted;

the head support assembly comprises a head support and an inner plate cover lock pin capable of inserting into the inner locking slot;

when the child safety seat is in the first usage state, the inner plate cover lock pin is inserted into the inner locking slot, the head support assembly and the inner plate cover are connected to slide with respect to the outer plate cover synchronously; when the child safety seat is in the second usage state, the second lock pin is inserted into the inner locking slot and the outer locking slot, so that the inner plate cover and the outer plater cover are connected and the inner plate cover lock pin is pushed out of the inner locking slot, and the head support assembly is disengaged from the inner plate cover so as to slide up and down with respect to the inner plate cover and the outer plate cover.

Preferably, an upper end portion of the unlocking member is provided with an unlocking tilted slot, the second lock pin seat is slidably inserted in the unlocking tilted slot, and the unlocking slope is formed on a wall of the unlocking tilted slot.

More preferably, the number of the second lock pin is two and they are disposed at intervals on the left and right, the inner plate cover and the outer plate cover are disposed between the two second lock pins, and a distance between upper ends of the unlocking tilted slots on the left and right sides is smaller than that between the lower ends thereof.

Preferably, the head support is provided with a first mounting slot, the inner plate cover lock pin is slidably disposed in the first mounting slot, and a wall of the first mounting slot and the inner plate cover is provided with a second elastic element therebetween for inserting the inner plate cover lock pin into the inner lock slot.

Preferably, the first position-limit portion and the second position-limit portion are respectively protrusions.

Preferably, a second mounting slot is provided on the head support, the second mounting slot is provided therein with a position lock pin capable of sliding left and right, a lower portion of the outer plate cover is provided with a plurality of first positioning slots spaced up and down, an upper portion of the outer plate cover is provided with a plurality of second positioning slots spaced up and down, the inner plate cover is provided with a plurality of third positioning slots spaced up and down, and the second positioning slots and the third positioning slots correspond one to one; when the child safety seat is in the first usage state, the positioning lock pin is inserted into any of the first positioning slots; when the child safety seat is in the second usage state, the second positioning slots are aligned with the corresponding third positioning slots, and the positioning lock pin is inserted into any of the second positioning slots and the corresponding third positioning slot.

Preferably, the head support assembly further comprises an adjustment handle capable of sliding up and down, a lower portion of the adjustment handle is provided with an adjustment tilted slot, and the positioning lock pin is provided with a protrusion slidably inserted in the adjustment tilted slot.

Preferably, between the housing and the unlocking member is provided a third elastic element for driving the unlocking member to move upward.

In combination with the above, the present disclosure employing the above technical solution has the following advantages over the prior art:

The child safety seat has two corresponding usage states according to the weight or age of the child, when the user is lighter or younger, the child is restrained by the five-point safety belt restraint system, and the height of the head support assembly is not higher than the predetermined position; when the user is heavier or older, the vehicle seat belt is used, the five-point safety belt restraint system can not be used, and the height of the head support assembly can be adjusted to the height of the predetermined position or above; by putting the seat belt buckle in the storage slot of the housing, the head support assembly can be adjusted upward to above the predetermined position, which is suitable for older children and prevents older children from using the five-point safety belt; in the case that a younger child uses the five-point safety belt, that is, the seat belt buckle is outside the storage slot, and the head support assembly can only be adjusted and used at the predetermined position and below, preventing young children from using the head support assembly higher than the predetermined position, and it is realized that the head support assembly can be adjusted within the set height range of the corresponding usage state according to the weight or age of the child.

BRIEF DESCRIPTION OF THE DRAWINGS

For more clearly explaining the technical solutions of the present disclosure, the accompanying drawings used to describe the embodiments are simply introduced in the following. Apparently, the below described drawings merely show a part of the embodiments of the present disclosure, and those skilled in the art can obtain other drawings according to the accompanying drawings without creative work.

FIG. 19 is a partial enlarged view of Part A in FIG. 18; wherein,

1—housing;
11—storage slot;
12—storage slot cover;
13—unlocking member cover;
13a—long slot;
2—seat belt buckle;
3—head support assembly;
31—head support fixed part;
311—first guide slot;
311a—position-limit face;
312—second guide slot;
313—gap;
4—first lock pin seat;
4a—unlocking slope;
41—first lock pin;
42—first elastic element;
5—unlocking member;
5a—unlocking slope;
51—third elastic element;
14—outer plate cover;
14a—second position-limit portion;
14b—outer lock slot;
14c—first positioning slot;
14d—second positioning slot;
15—inner plate cover;
15a—first position-limit portion;
15b—inner lock slot;
15c—third positioning slot;
32—head support;
321—inner plate cover lock pin;
322—second elastic element;
323—positioning lock pin;
323a—protrusion;
324—fourth elastic element;
33—adjustment handle;
331—adjustment tilted slot;
6—second lock pin seat;
61—second lock pin;
7—unlocking portion;
7a—unlocking tilted slot;
71—third elastic element.

DETAILED DESCRIPTION OF EXEMPLARY EMBODIMENTS

Figure 3:
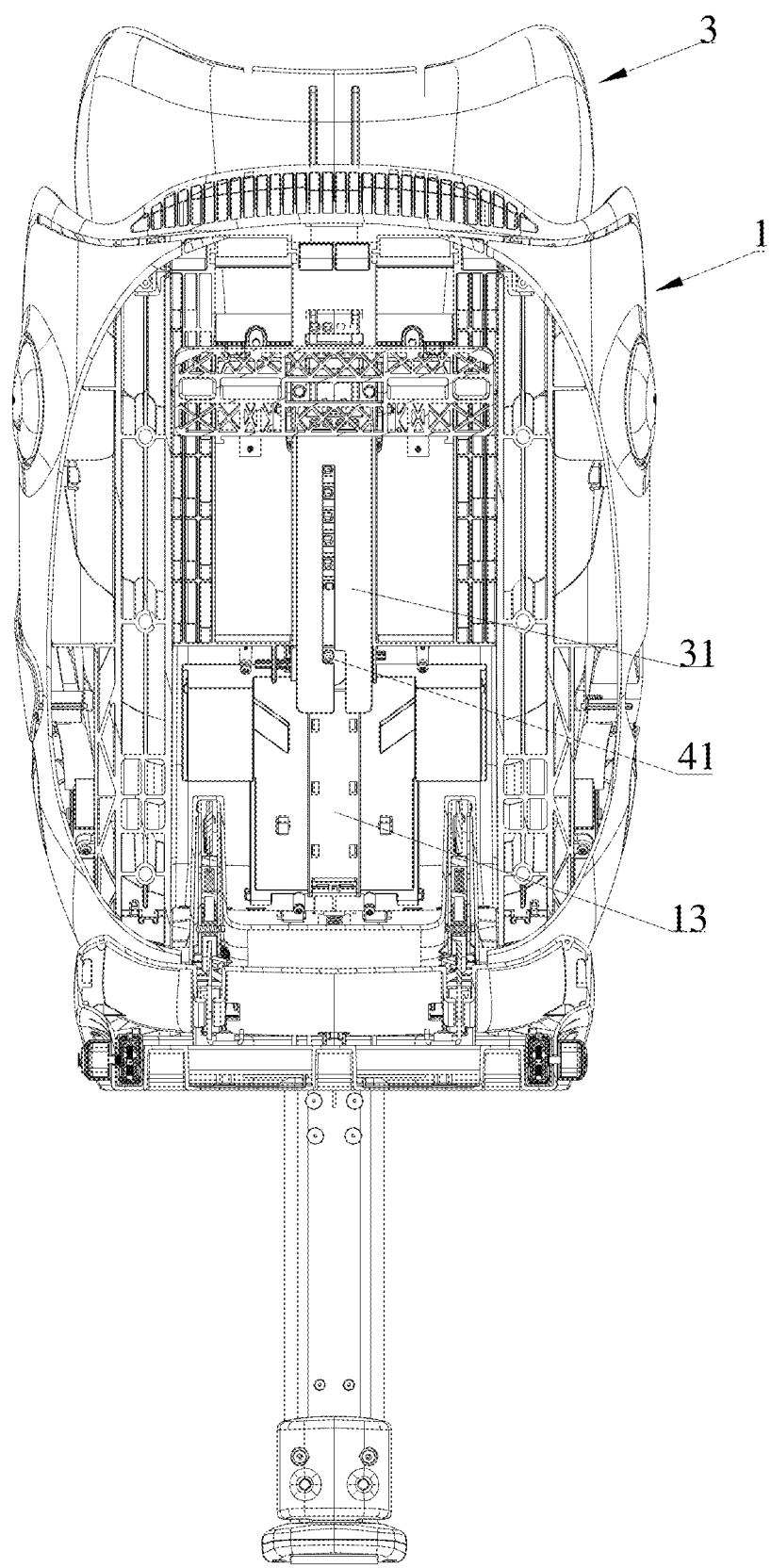
FIG. 3 is a partial cross-sectional view of the child safety seat shown in FIG. 1.

In the following, the preferable embodiments of the present disclosure are explained in detail combining with the accompanying drawings so that the advantages and features of the present disclosure can be easily understood by the skilled persons in the art. The orientational words mentioned in the present disclosure are defined according to the observation angle of the child safety seat by those skilled in the art, for example, "left" and "right" corresponding to the left and right sides of the paper in FIG. 3 respectively.

Embodiment 1

Figure 5:
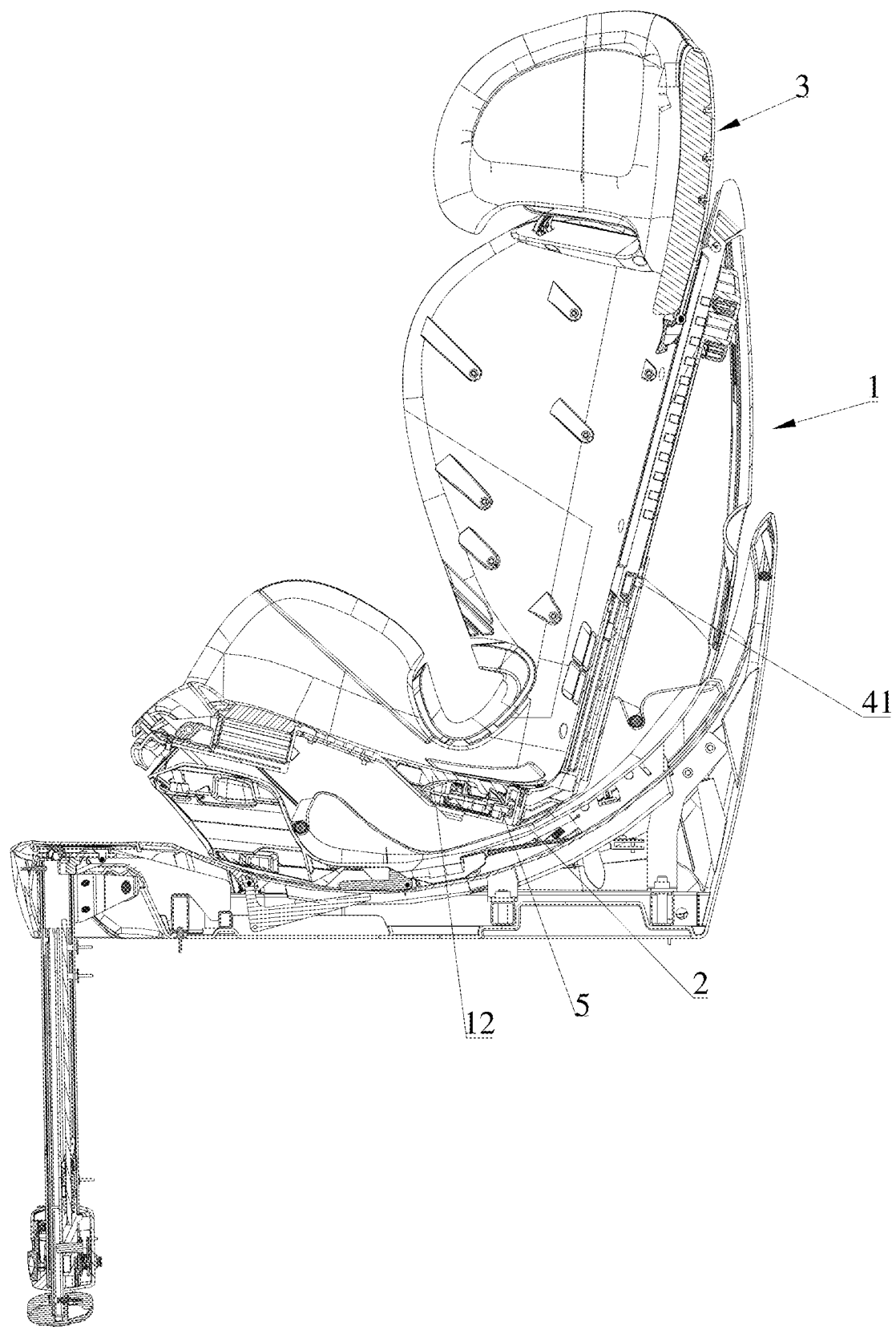
FIG. 5 is a cross-sectional view of the child safety seat of FIG. 1 in the second usage state along the front-and-rear direction.
Figure 6:
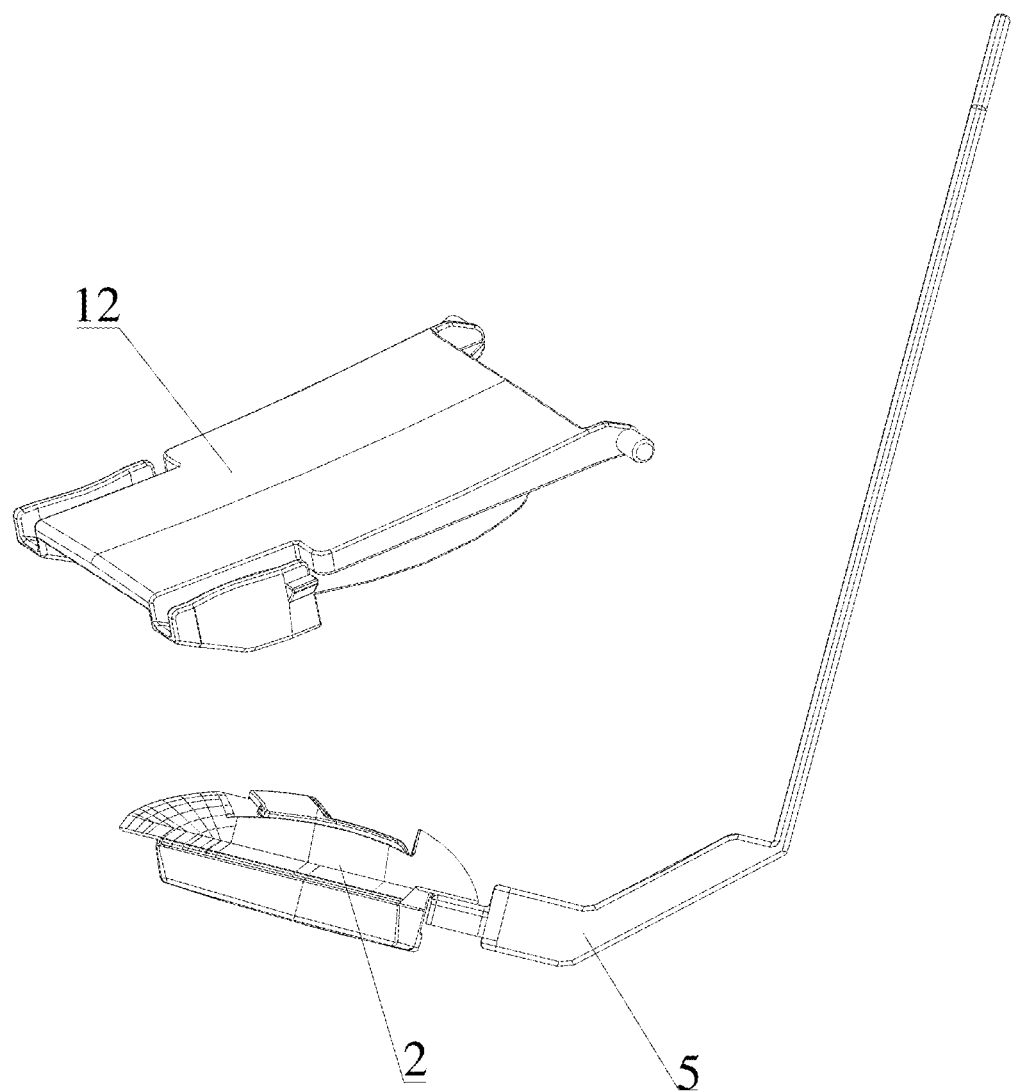
FIG. 6 is a partial exploded schematic view of FIG. 5.
Figure 7:
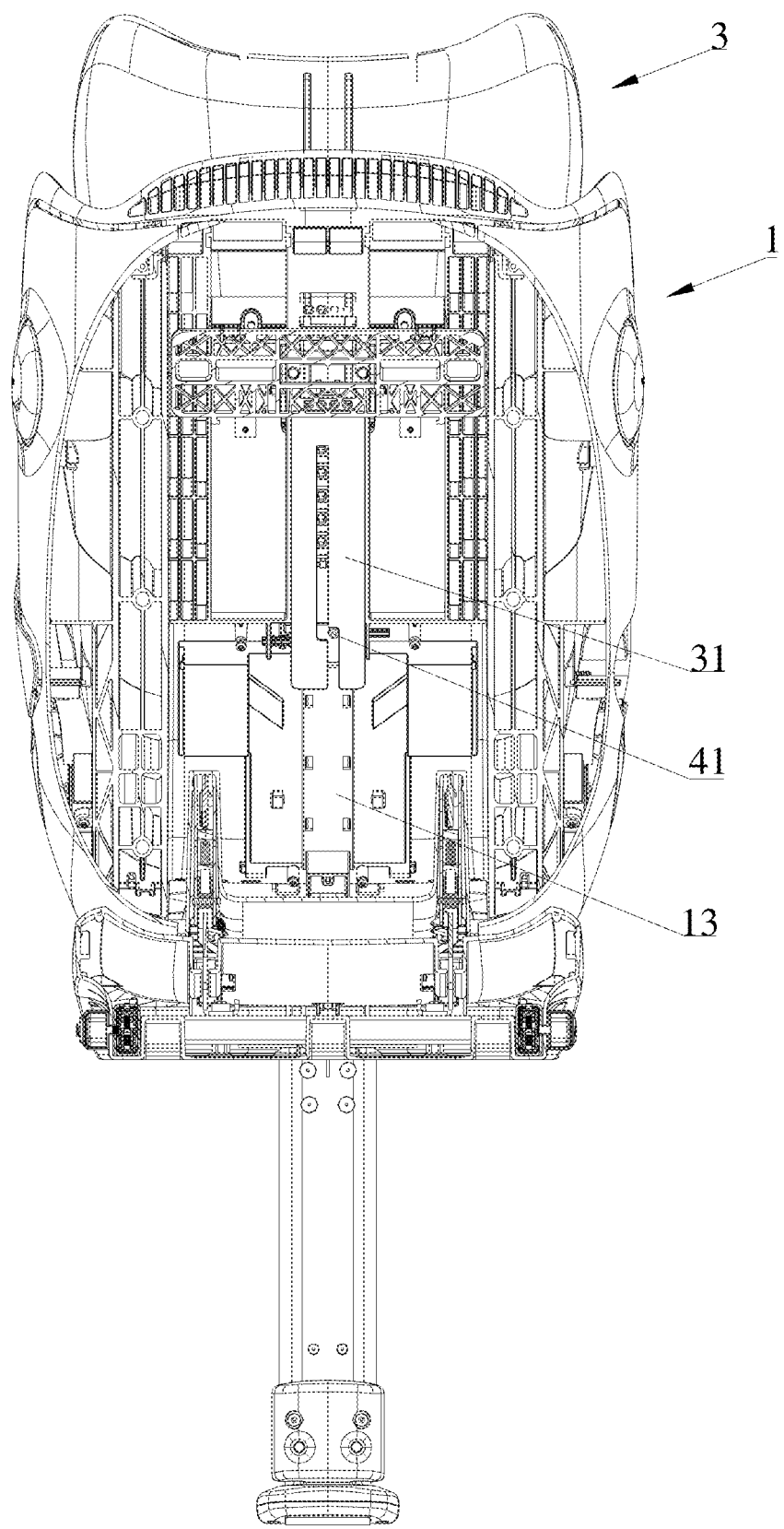
FIG. 7 is a partial cross-sectional view of the child safety seat shown in FIG. 5.

This embodiment provides a child safety seat according to the present disclosure, which comprises a seat body and a five-point safety belt disposed on the seat body, the five-point safety belt mainly consists of two shoulder safety belts, two waist safety belts, a crotch safety belt and a seat belt buckle 2 connecting the five safety belts to each other, to restrain and protect the child on the seat body. The child safety seat has two usage states, namely a first usage state shown in FIGS. 1 and 3 and a second usage state shown in FIGS. 5 and 7.

Referring to FIGS. 1-8*b*, the seat body comprises a housing 1, and the housing 1 is internally provided with a storage slot 11 used for storing the safety belt buckle 2. When the child safety seat is in the first usage state, the safety belt buckle 2 is located outside the storage slot 11 all the time, that is, the five-point safety belt is normally placed on the seat body to allow the use of the five-point safety belt to restrain the child sitting on the seat body. When the child safety seat is in the second usage state, the safety belt buckle 2 is located in the storage slot 11, the five-point safety belt is not allowed to be used, and only the vehicle seat belt can be used. By placing the seat belt buckle 2 in the storage slot 11 of the housing 1 and buckling a storage slot cover 12, the five-point safety belt can be effectively prevented from being misused in the second usage state. Wherein, the seat belt buckle 2 can be put into the storage slot 11 in a state of being connected to the seat belt.

The seat body further comprises a head support assembly 3 disposed on the housing 1 in a sliding up and down manner, the height of the head support assembly 3 is adjustable to have a plurality of positions corresponding to different heights, one of the positions is a predetermined position, the head support assembly 3 can be adjusted up and down in the position below the predetermined position to adapt to the use of a five-point safety belt for smaller children, and the head support assembly 3 is adjusted at a position above the predetermined position to adapt to the use of vehicle seat belts for older children. When the child safety seat is in the first usage state, and the head support assembly 3 is in any position between the lowest position and the predetermined position, the seat belt buckle 2 can be put into the storage slot 11, and when the seat belt buckle 2 is placed in the storage slot 11, the head support assembly 3 is adjusted upward to convert the child safety seat to the second usage state.

The seat body further comprises a position-limit mechanism for preventing the head support assembly 3 from being higher than the predetermined position and an unlocking member 5 for releasing the position limit of the head support assembly 3 and the position-limit mechanism, and the unlocking member 5 is slidably disposed on the housing 1 and one end of the unlocking member 5 is movably disposed in the storage slot 11. When the child safety seat is in the first usage state, blocked by the position-limit mechanism, the head support assembly 3 is not higher than the predetermined position, that is, the head support assembly 3 can only be in the lowest position, the predetermined position or between the lowest position and the predetermined position. When the child safety seat is converted from the first usage state to the second usage state, the seat belt buckle 2 is placed in the storage slot 11 and presses the one end of the unlocking member 5 to release the position limit of the position-limit mechanism and the head support assembly 3, and the head support assembly 3 is able to be adjusted upward. When the child safety seat is in the second usage state, the head support assembly 3 is higher than the predetermined position, and the height of the head support assembly 3 is adjusted between the predetermined position and the highest position. Only after the seat belt buckle 2 is put into the storage slot 11, the head support assembly 3 can be released from the position limit and adjusted upward to adapt to the height of the child, avoiding the misuse of the five-point safety belt in the second usage state.

Figure 1:
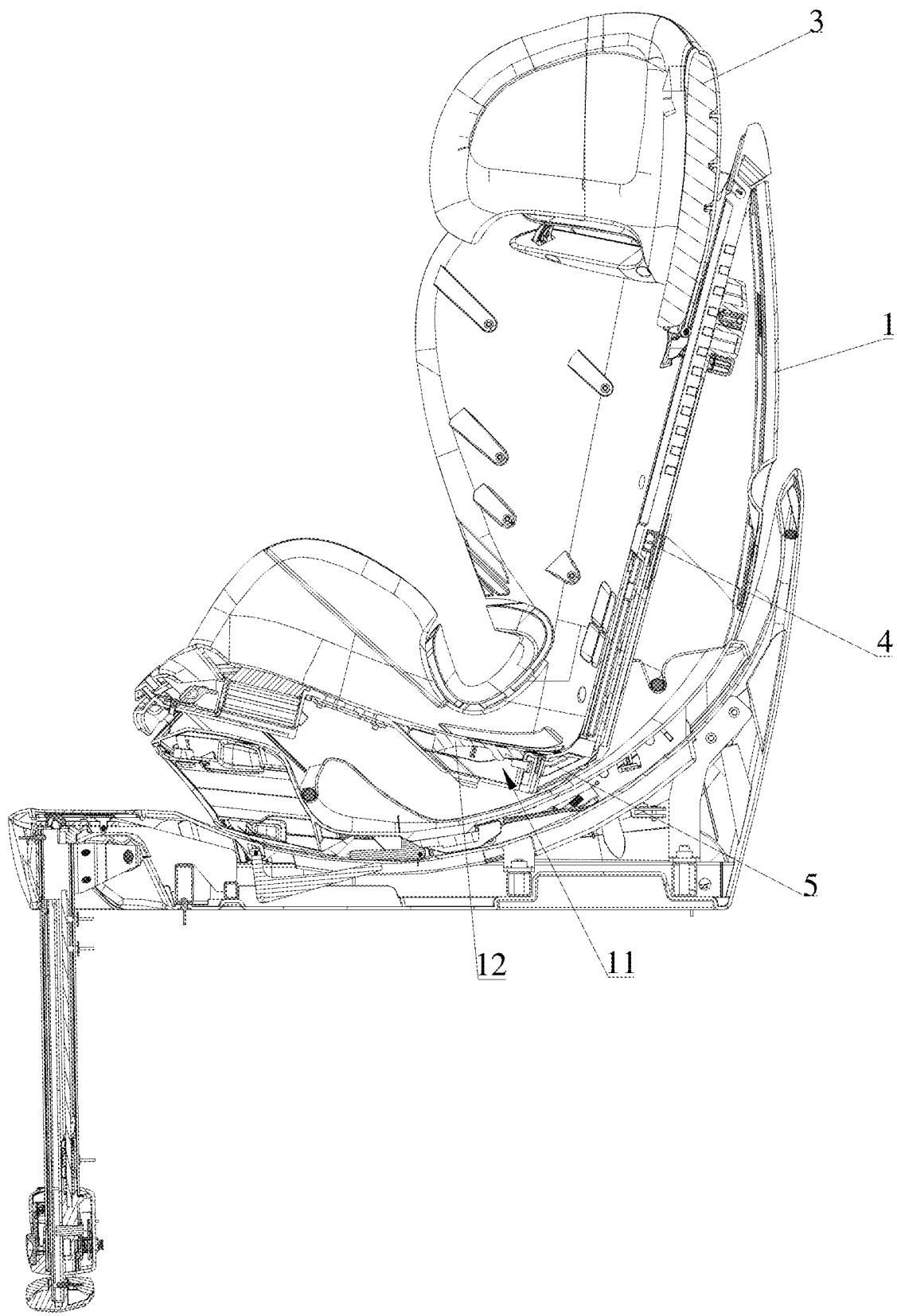
FIG. 1 is a cross-sectional view of a child safety seat according to the present disclosure in the first usage state along the front-and-rear direction.
Figure 2:
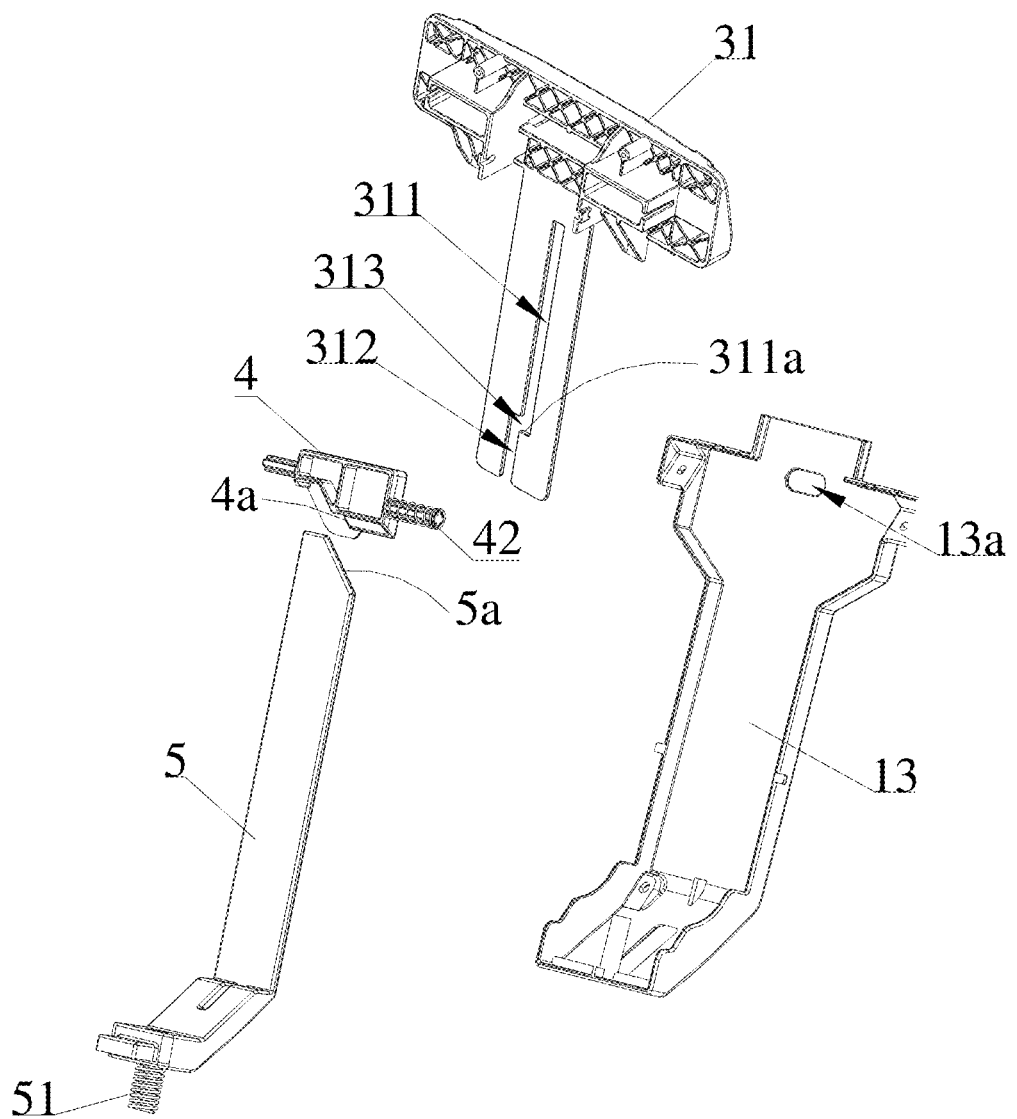
FIG. 2 is a partial exploded schematic view of FIG. 1.

Specifically, as shown in FIG. 1 and FIG. 2, in this embodiment, the unlocking member 5 is disposed on the housing 1 in a sliding up and down manner, and a lower end portion of the unlocking member 5 is movably disposed in the storage slot 11. When the seat belt buckle 2 is put into the storage slot 11, the end portion of the seat belt buckle 2 presses the lower end of the unlocking member 5 and drives the unlocking member 5 to move downward for a certain distance. Between the housing 1 and the unlocking member 5 is provided a third elastic element 51 for driving the unlocking member 5 to move upward, and the third elastic element 51 is specifically a compression spring disposed between the unlocking member 5 and the housing 1, wherein the lower portion of the unlocking member 5 is connected with the upper end of the compression spring.

The head support assembly 3 comprises a head support fixed part 31, and the head support fixed part 31 is formed with a position-limit face 311a facing upward thereon. The position-limit mechanism comprises a first lock pin seat 4 disposed on the housing 1 in a sliding left and right manner, the first lock pin seat 4 is provided with a first lock pin 41 cooperating with the position-limit face 311a, and when the head support assembly 3 is in the predetermined position, the first lock pin 41 pushes against the position-limit face 311a, and blocked by the first lock pin, the head support fixed part 31 cannot continue to slide upward. That is to say, when the child safety seat is in the first usage state, the first lock pin 41 is located directly above the position-limit face 311a or pushes against the position-limit face 311a; when the child safety seat is in the second usage state, the first lock pin 41 is located on the left or right side of the position-limit face 311a to disengage from the position-limit face 311a. Specifically as shown in FIGS. 2, 4a, 4b, 8a and 8b, the head support fixed part 31 is opened with a first guide slot 311 thereon, the first guide slot 311 extends along a up-and-down direction, the position-limit face 311a is formed on a lower wall of the first guide slot 311, and in addition, a right wall of the first guide slot 311 is opened with a gap 313 for the first lock pin 41 to go in and out, and a lower end of the gap 313 is preferably level with the position-limit face 311a. When the child safety seat is in the first usage state, the first lock pin 41 is slidably inserted in the first guide slot 311; when the child safety seat is in the second usage state, the first lock pin 41 slides out from the gap 313 and is located outside the first guide slot 311.

Figure 4A:
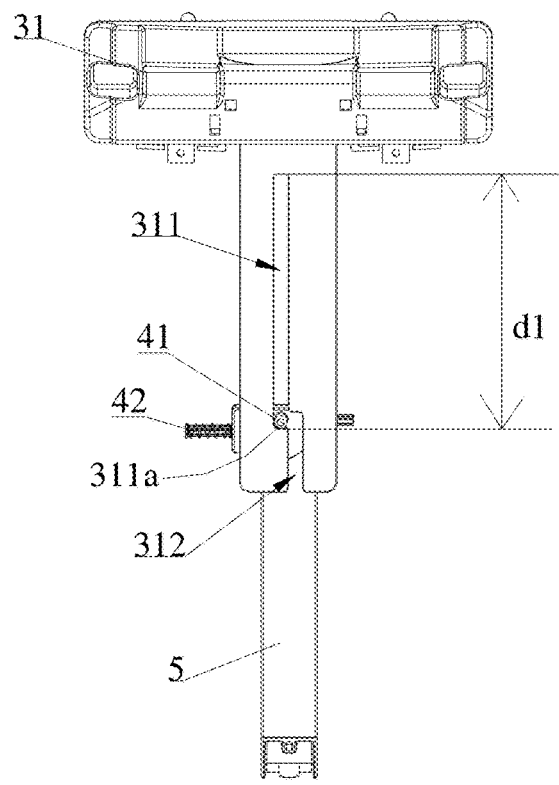
FIGS. 4*a* and 4*b* are a rear view and a front view of the unlocking member and the position-limit mechanism in FIG. 3, respectively.
Figure 4B:
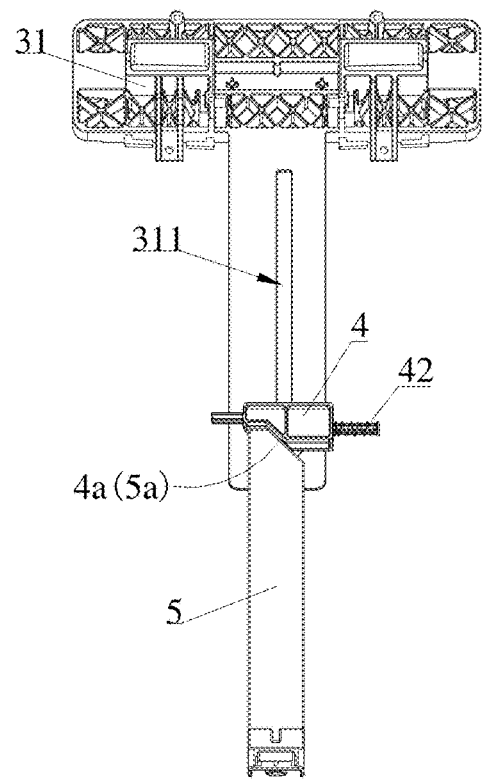
Figure 8A:
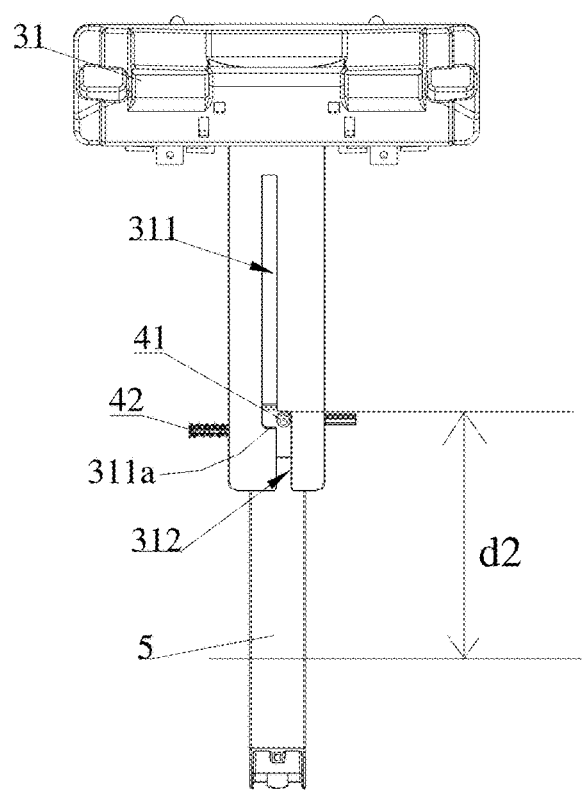
FIGS. 8*a* and 8*b* are a rear view and a front view of the unlocking member and the position-limit mechanism in FIG. 7, respectively.
Figure 8B:
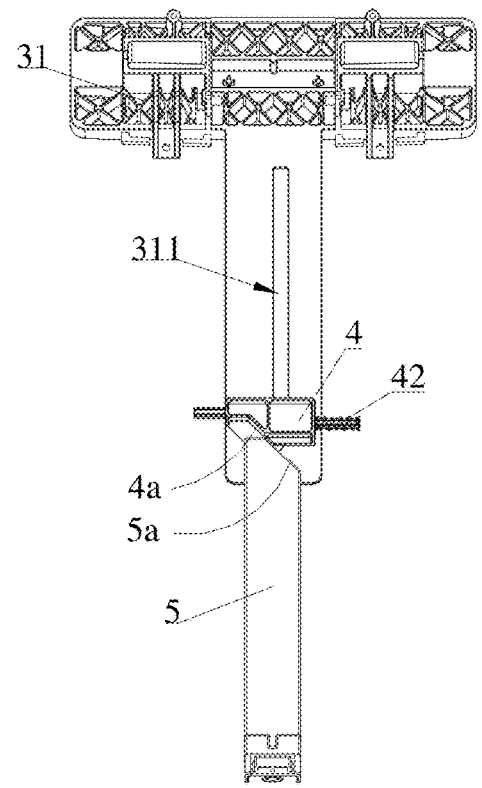
Figure 9:
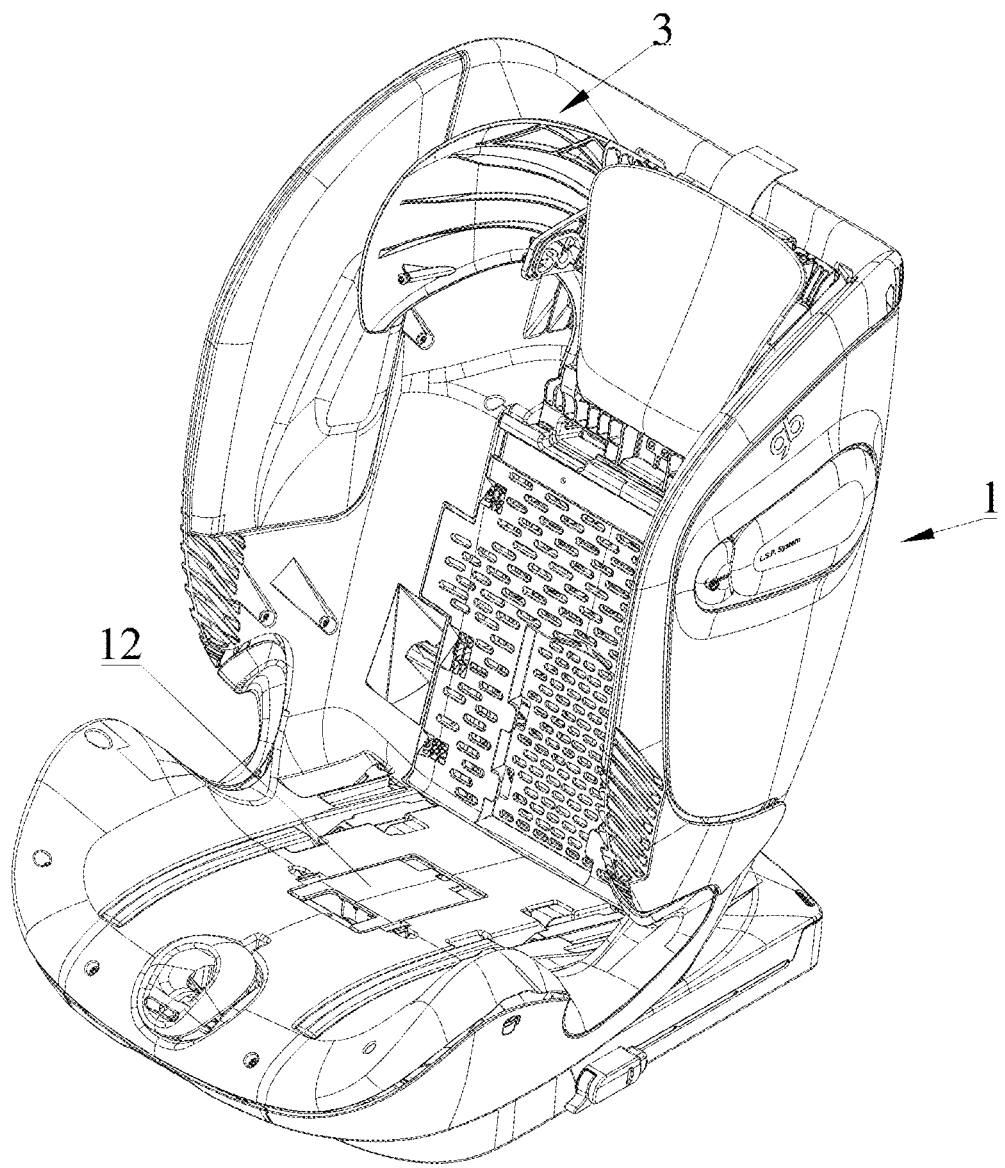
FIG. 9 is a schematic structural diagram of another child safety seat according to the present disclosure.

Further, the head support fixed part 31 is further opened thereon with a second guide slot 312 extending the up-and-down direction, the second guide slot 312 is in communication with the first guide slot 311 via the gap 313, and an upper end of the gap 313 is preferably level with an upper wall of the second guide slot 312. When the child safety seat is in the second usage state, the first lock pin 41 is slidably inserted in the second guide slot 312 or located directly under the second guide slot 312. As shown in FIGS. 4a and 4b, when the child safety seat is in the first usage state, the height adjustment range of the head support assembly 3 is shown as d1 in FIG. 4a, and d1 is equal to the length of the first guide slot 311; as shown in FIGS. 8a and 8b, when the child safety seat is in the second usage state, the height adjustment range of the head support assembly 3 is shown as d2 in FIG. 8a, d2 is greater than the length of the second guide slot 312, and the lower end of the second guide slot 312 is open, and as the head support assembly 3 is gradually adjusted upward, the first lock pin 41 is disengaged from the second guide slot 312 and is located directly under the second guide slot 312. It should also be noted that: the position-limit face 311a is formed on the lower wall of the first guide slot 311, and is used to prevent the height of the head support assembly 3 from being adjusted upwards above the predetermined position in the first usage state; the upper wall of the two guide slots 312 also has a position limiting function, which is used to prevent the height of the head support assembly 3 from being lower than the predetermined position in the second usage state.

The housing 1 comprises an unlocking member cover 13, and the unlocking member cover 13 is buckled on the rear side and the lower side of the unlocking member 5. An upper portion of the unlocking member cover 13 is provided with a long slot 13a extending in the left-right direction, and the first lock pin 41 is inserted into the long slot 13a to be slidable left and right. The unlocking member 5 is in a tight contact with the first lock pin seat 4 and at least one of the components is provided with an unlocking slope that contacts and cooperates with the other component, and the unlocking slope is gradually tilted upward or downward from left to right. Specifically, in this embodiment, the upper end portion of the unlocking member 5 has an unlocking slope 5a that gradually tilts downward from right to left, and the first lock pin seat 4 also has an unlocking slope 4a that gradually tilts downward from right to left, and the two unlocking slopes 5a and 4a contact and cooperate with each other. A first elastic element 42 is provided between the first lock pin seat 4 and the housing 1 to push the first lock pin seat 4 to move so that the first lock pin 41 enters the second guide slot 312 from the first guide slot 311. Specifically, the first elastic element 42 is a compression spring sleeved on the end portion of the first lock pin seat 4, and both ends of the compression spring pushes against the first lock pin seat 4 and the housing 1, respectively. When the child safety seat is converted from the first usage state to the second usage state, as the seat belt buckle 2 is placed in the storage slot 11 and presses the lower end of the unlocking member 5 to move downward as the safety belt buckle 2, and the unlocking member 5 is moved downward, so that the first elastic element 42 is gradually reset, pushing the first lock pin seat 4 to move to the right to enter the second guide slot 312 through the gap 313, the first lock pin seat 4 is disengaged from the position-limit face 311a in the guide slot 311, and the head support assembly 3 can be adjusted upward. When the child safety seat is converted from the second usage state to the first usage state, the seat belt buckle 2 is taken out from the storage slot 11, the third elastic element 51 is reset, pushing the unlocking member 5 to move upward, and the first lock pin seat 4 moves to the left under the push of the unlocking slope 5a, the first lock pin 41 enters the first guide slot 311 through the gap 313, and the head support assembly 3 is not higher than the predetermined position.

The child safety seat in this embodiment is suitable for children of different weights and different ages. A safety seat suitable for children with 0-36 Kg is taken as an example to describe the use process of the child safety seat of the present disclosure. For infants of 0-18 Kg, the child safety seat needs to be converted to the first usage state, refer to FIGS. 1-4, in this first usage state, the seat belt buckle 2 is normally on the seat body, the five-point safety belt must be used to restrain infants; the first lock pin 41 is inserted in the first guide slot 311, and the head support assembly 3 can move upward to the predetermined position at most, that is, the height of the head support assembly 3 can only in the lowest position, the predetermined position, or between the two, to adapt to the height of the child. For older children of 15-36 Kg, the child safety seat needs to be converted to the second usage state, as shown in FIGS. 5-8, in this second usage state, the child is restrained by the vehicle belt and the five-point safety belt cannot be used, the seat belt buckle 2 must be put into the storage slot 11, and the storage slot cover 12 should be buckled to prevent misuse of the five-point safety belt; the lower end of the unlocking member 5 is pressed by the seat belt buckle 2 and moves down, the first locking pin 41 is located at or below the second guide slot 312, and the height of the head support assembly 3 is adjusted to above the predetermined position to adapt to the height of older children.

Embodiment 2

FIGS. 9-19 show another child safety seat according to the present disclosure, this embodiment and Embodiment 1 differs in that the unlocking member 5 and the position-limit mechanism are different.

Referring to FIGS. 9-19, the child safety seat comprises a seat body and a five-point safety belt arranged on the seat body. The child safety seat has two usage states, namely a first usage state shown in FIGS. 11-13 and a second usage state shown in FIGS. 14 and 15. The seat body comprises a housing 1, and the housing 1 is internally provided with a storage slot 11 used for storing the safety belt buckle 2 of the five-point safety belt. When the child safety seat is in the first usage state, the five-point safety belt is used. When the child safety seat is in the second usage state, the safety belt buckle 2 is located in the storage slot 11, the five-point safety belt is not allowed to be used, and only the vehicle seat belt can be used to restrain the child. By placing the seat belt buckle 2 in the storage slot 11 of the housing 1 and buckling a storage slot cover 12, the five-point safety belt can be effectively prevented from being misused in the second usage state.

The seat body further comprises a head support assembly 3 disposed on the housing 1 in a sliding up and down manner, the height of the head support assembly 3 is adjustable so as to have a plurality of positions corresponding to different heights, and one of the positions is the predetermined position. When the child safety seat is in the first usage state, the seat belt buckle 2 can be put into the storage slot 11 only when the head support assembly 3 is in the predetermined position, and when the seat belt buckle 2 is placed in the storage slot 11, the head support assembly 3 is adjusted upward to convert the child safety seat to the second usage state.

The seat body further comprises a position-limit mechanism for preventing the head support assembly 3 from being higher than the predetermined position and an unlocking member 7 for releasing the position limit of the head support assembly 3 and the position-limit mechanism, and the unlocking member 7 is slidably disposed on the housing 1 and one end of the unlocking member 7 is movably disposed in the storage slot 11. When the child safety seat is in the first usage state, blocked by the position-limit mechanism, the head support assembly 3 is not higher than the predetermined position, that is, the head support assembly 3 can only be in the lowest position, the predetermined position or between the lowest position and the predetermined position. When the child safety seat is converted from the first usage state to the second usage state, the seat belt buckle 2 enters the storage slot 11 and presses the one end of the unlocking member 7 to release the position limit of the position-limit mechanism and the head support assembly 3. When the child safety seat is in the second usage state, the head support assembly 3 is higher than the predetermined position, and the height of the head support assembly 3 is adjusted between the predetermined position and the highest position. Only after the seat belt buckle 2 is put into the storage slot 11, the head support assembly 3 can be released from the position limit and adjusted upward to adapt to the height of the child, avoiding the misuse of the five-point safety belt in the second usage state. In addition, when the child safety seat is in the first usage state, the seat belt buckle 2 is located outside the storage slot 11 only when the head support assembly 3 is lower than the predetermined position, and the five-point safety belt is used to restrain the child, and the seat belt buckle 2 can be put into the storage slot 11 when the head support assembly 3 is in the predetermined position, thereby allowing the seat belt buckle 2 to be put inside the storage slot 11 to switch to the second usage state.

Figure 10A:
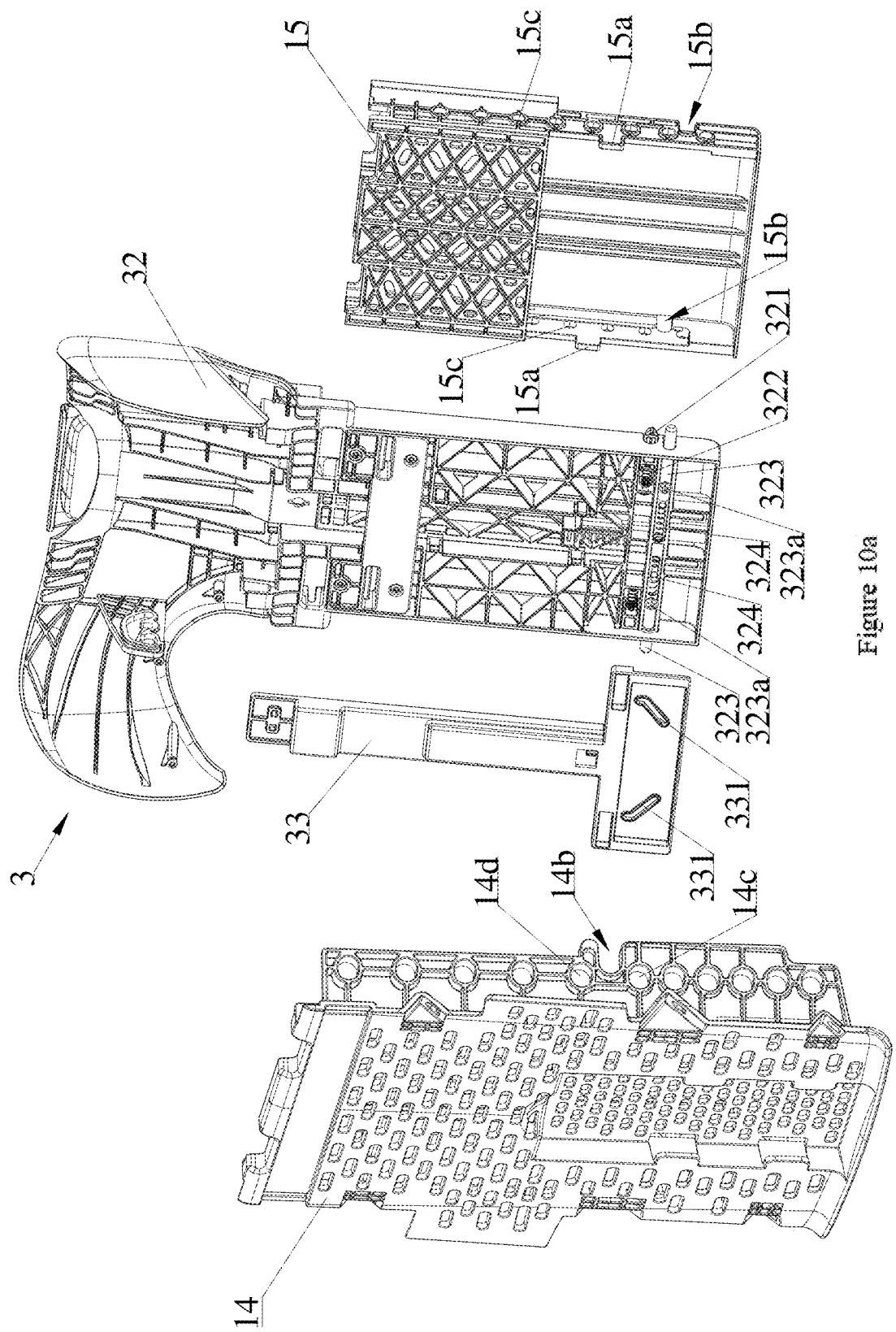
FIGS. 10*a* and 10*b* are partial exploded schematic views of FIG. 9, respectively.
Figure 10B:
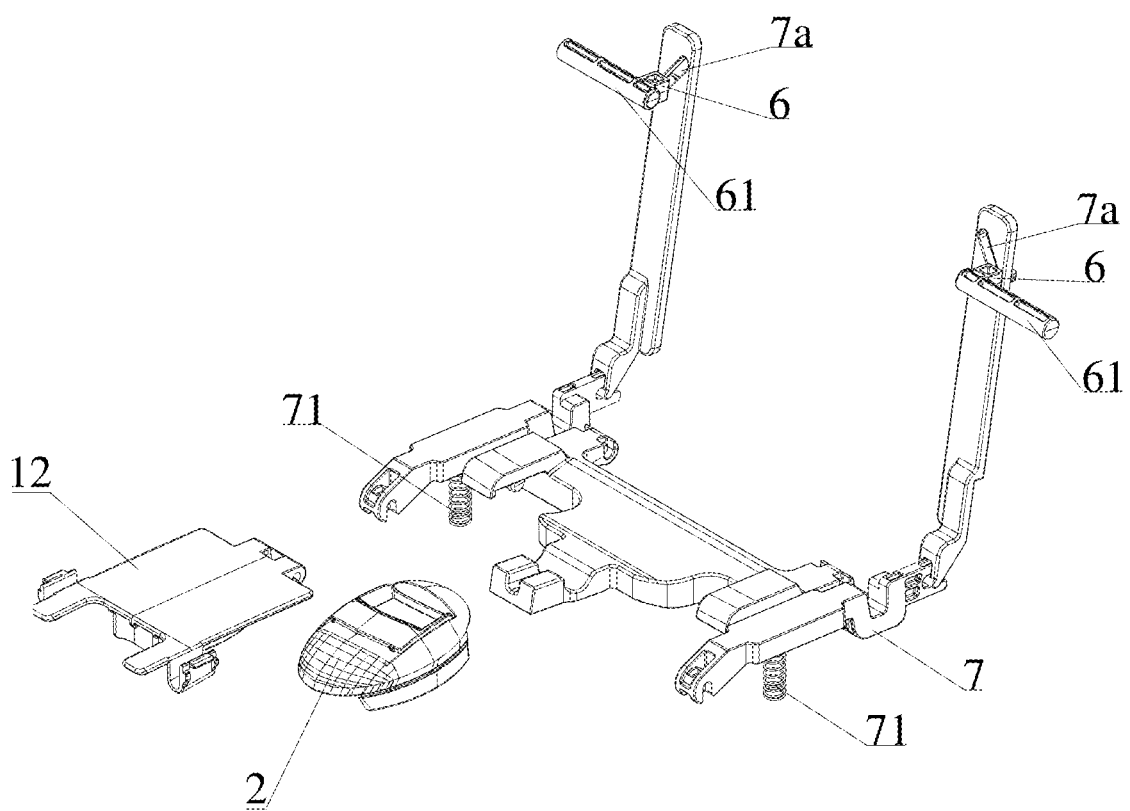

Referring to FIG. 10b, in this embodiment, the unlocking member 7 is disposed on the housing 1 in a sliding up and down manner, and a lower end portion of the unlocking member 7 is movably disposed in the storage slot 11. When the seat belt buckle 2 is put into the storage slot 11, the end portion of the seat belt buckle 2 presses the lower end of the unlocking member 7 and drives the unlocking member 7 to move downward for a certain distance. Between the housing 1 and the unlocking member 7 is provided a third elastic element 71 for driving the unlocking member 7 to move upward, and the third elastic element 71 is specifically a compression spring disposed between the unlocking member 7 and the housing 1, wherein the lower portion of the unlocking member 7 is connected with the upper end of the compression spring.

Figure 13:
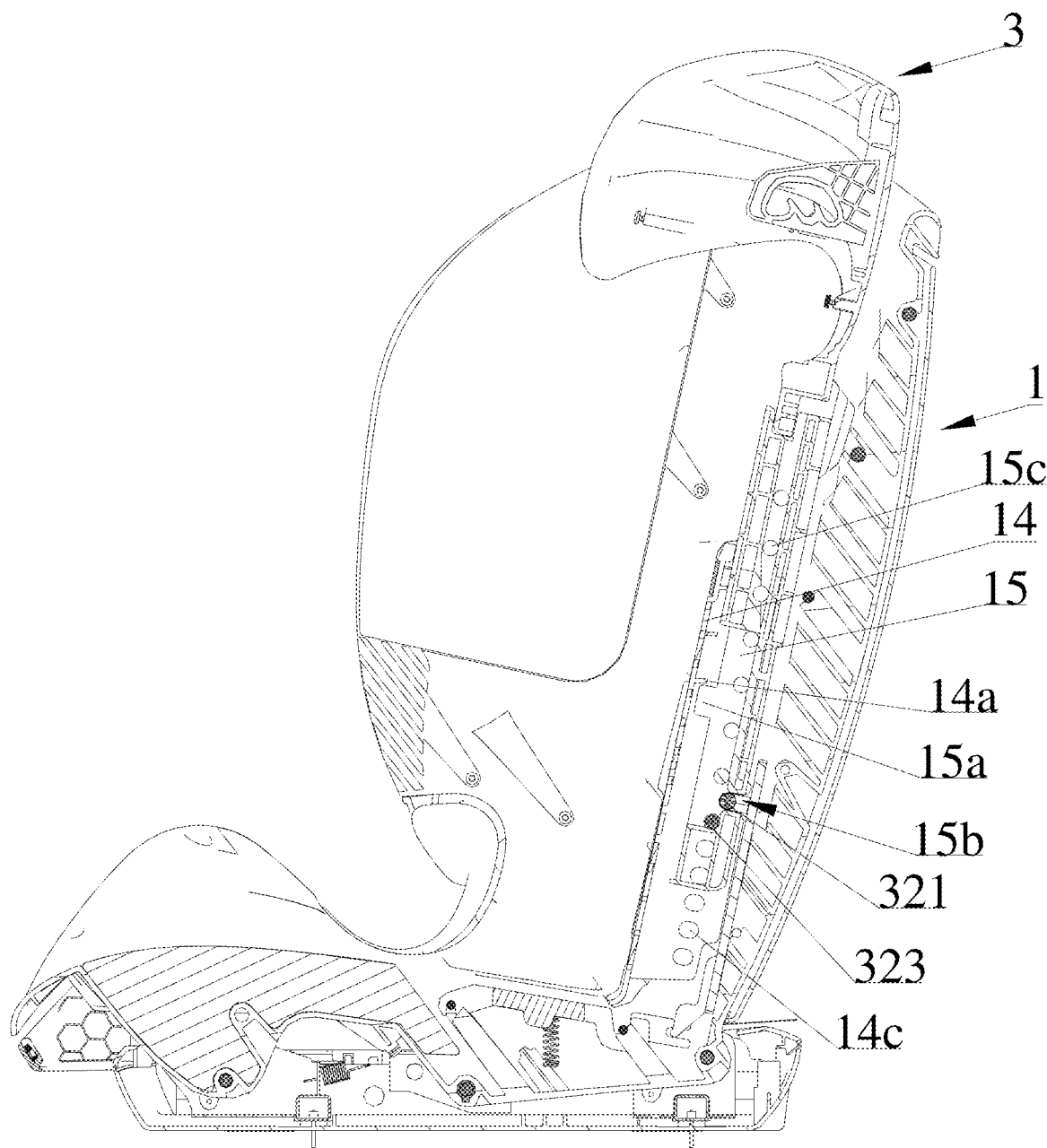

Combining with FIG. 10a and FIG. 13, the housing 1 specifically comprises a fixed outer plate cover 14 and an inner plate cover 15 capable of sliding relative to the outer plate cover 14, the position-limit mechanism comprises a first position-limit portion 15a formed on the inner plate cover 15 and a second position-limit portion 14a formed on the outer plate cover 14, the first position-limit portion 15a is located directly under the second position-limit portion 14a, and when the head support assembly 3 is in the predetermined position, the first position-limit portion 15a pushes against the second position-limit portion 14a. Specifically, in this embodiment, as shown in FIG. 13, the outer plate cover 14 is surrounded and disposed on the front side of the inner plate cover 15, the first position-limit portion 15a and the second position-limit portion 14a respectively protrudes, and the first position-limit portion 15a is a protrusion portion of the inner plate cover 15 extending forward, and the second position-limit portion 14a is a transverse rib of the outer plate cover 14 extending backward.

The seat body further comprises a second lock pin 61, the second lock pin 61 is disposed on a second lock pin seat 6, the unlocking member 7 is in a tight contact with the second lock pin seat 6 and at least one of the components is provided with an unlocking slope that contacts and cooperates with the other component, and the unlocking slope gradually is tilted upward or downward from left to right. An upper end portion of the unlocking member 7 is provided with an unlocking tilted slot 7a, the second lock pin seat 6 is slidably inserted in the unlocking tilted slot 7a, and the unlocking slope is formed on a wall of the unlocking tilted slot 7a. The number of the second lock pin is two and they are disposed at intervals on the left and right, the inner plate cover 15 and the outer plate cover 14 are disposed between the two second lock pins 61, the unlocking tilted slots 7a on the left and right sides are provided symmetrically and a distance between upper ends of the unlocking tilted slots 7a on the left and right sides is smaller than that between the lower ends thereof. That is, referring to FIG. 10b, the left unlocking tilted slots 7a gradually tilts upward from left to right, and the right unlocking tilted slots 7a gradually tilts upward from right to left.

Figure 18:
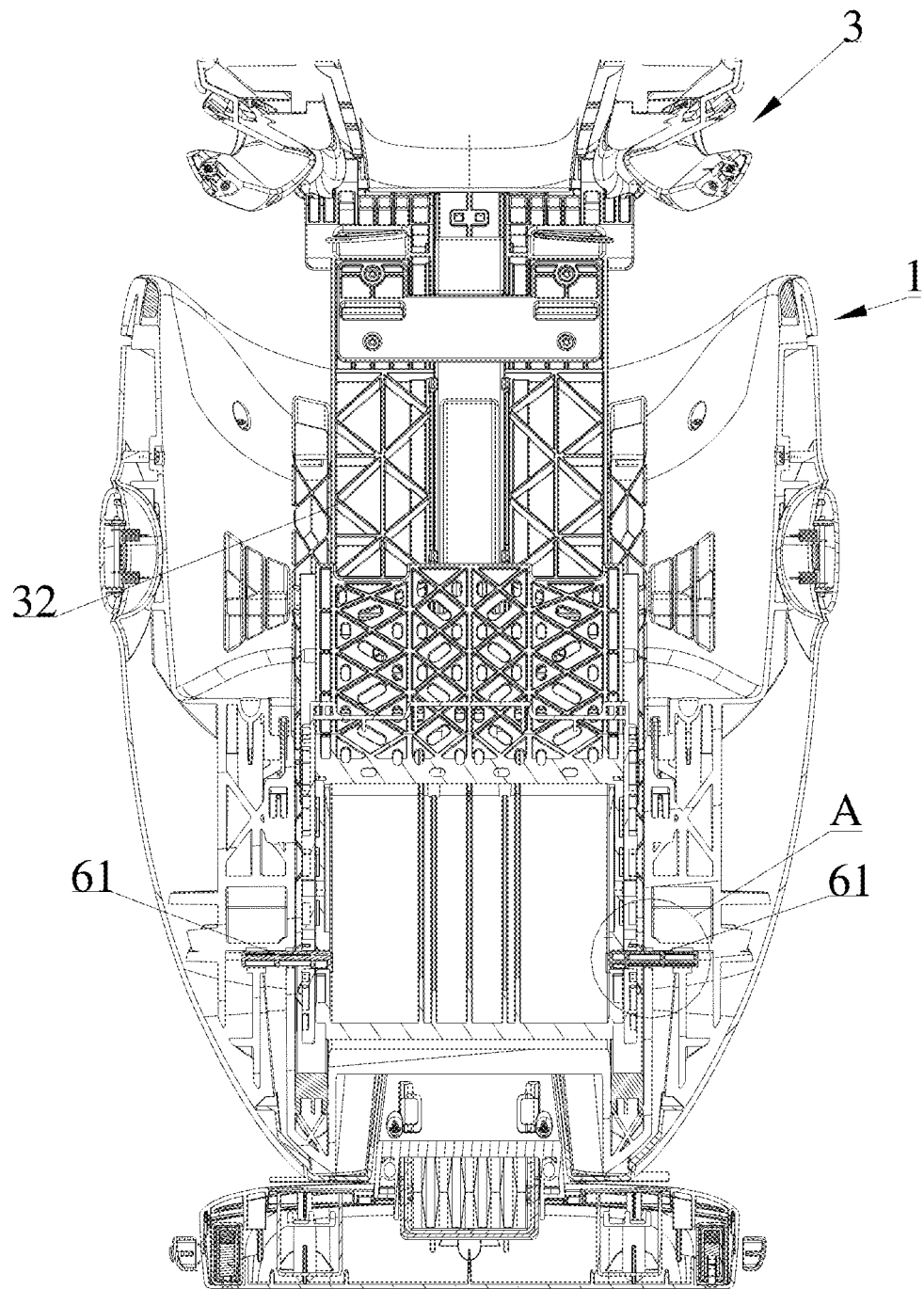
FIG. 18 is a cross-sectional view of the child safety seat of FIG. 9 in the second usage state along the left-and-right direction.
Figure 19:
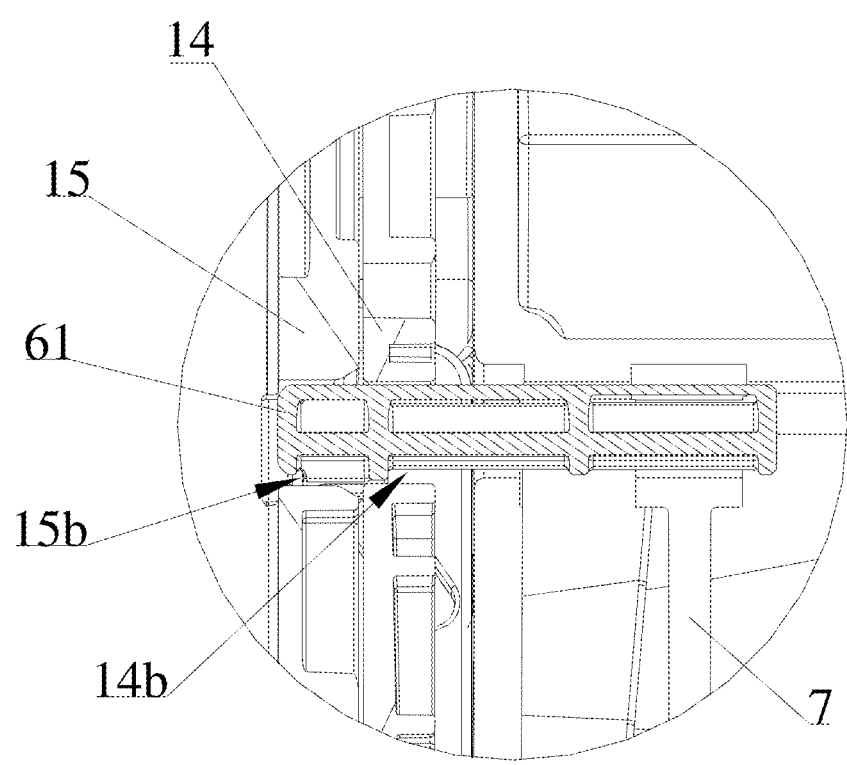

The outer plate cover 14 is provided with an outer locking slot 41b into which the second lock pin 61 is inserted, and the inner plate cover 15 is provided with an inner locking slot 15b into which the second lock pin 61 is inserted. The head support assembly 3 specifically comprises a head support 32 and an inner plate cover lock pin 321 that can be inserted into the inner lock slot 15b, in this embodiment, the lower portion of the head support 32 is located between the inner plate cover 15 and the outer plate cover 14. Combining with FIGS. 14 and 15, when the child safety seat is in the first usage state, the inner plate cover lock pin 321 is inserted into the inner lock slot 15b to connect the head support assembly 3 and the inner plate cover 15 as a whole, thereby synchronously sliding up and down with respect to the outer plate cover 14, at this moment, when the head support assembly 3 slides to the predetermined position as shown in FIG. 13, the second position-limit portion 14a on the outer plate cover 14 blocks the first limiting portion 15a on the inner plate cover 15, and the head support assembly 3 cannot be further adjusted upward. As shown in FIGS. 18 and 19, when the child safety seat is in the second usage state, the inner lock slot 15b and the outer lock slot 14b are aligned with each other, and the second lock pin 61 is inserted into the inner lock slot 15b and the outer lock slot 14b, so that the inner plate cover 15 and the outer plate cover 14 are connected as a whole, and at this time, the second lock pin 61 pushes the inner plate cover lock pin 321 out of the inner lock slot 15b, so that the head support assembly 3 is disengaged from the inner plate cover 15, so as to be able to slide up and down with respective to the inner plate cover 15 and the outer plate cover 14. After the seat belt buckle 2 is placed in the storage slot 11, the second lock pin 61 moves in the unlocking tilted slot 7a, and the inner plate cover lock pin 321 is pushed from the inner lock slot 15b.

The lower portion of the head support 32 is provided with a first mounting slot extending in the left-right direction, the inner plate cover lock pin 321 is slidably disposed in the first mounting slot, between the wall of the first mounting slot and the inner plate cover lock pin 321 is disposed a second elastic element 322 for inserting the inner plate cover lock pin 321 into the inner lock slot 15b. The second elastic element 322 is specifically a compression spring disposed on the wall of the mounting slot and the inner plate cover lock pin 321. When the child safety seat is in the first usage state, the second elastic element 322 is in an initial state; when it is converted to the second usage state, the second elastic element 322 is compressed by the inner plate cover lock pin 321 pushed out of the inner lock slot 15b; when the second lock pin 61 is disengaged from the inner lock slot 15b, the second elastic element 322 is reset and pushes the inner plate cover lock pin 321 into the inner lock slot 15b to connect the head support 32 and the inner plate cover 15.

The lower part of the head support 32 is also provided with a second mounting slot extending in the left and right direction, two positioning lock pins 323 are provided in the second mounting slot, the positioning lock pin 323 is able to slide left and right in the second mounting slot, and the positioning lock pin 323 is located below the inner plate cover lock pin 321. The portion of the outer plate cover 14 below the outer lock slot 14b is provided with a plurality of first positioning slots 14c at equal intervals up and down, and the part of the outer plate cover 14 above the outer lock slot 14b is provided with a plurality of second positioning slots 14d at equal intervals up and down, the portion of the inner plate cover 15 above the inner lock slot 15b is provided with a plurality of third positioning slots 15c at equal intervals up and down, and the second positioning slots 14d and the third positioning slots 15c have the same number and correspond one to one. When the child safety seat is in the first usage state, the positioning lock pin 323 is inserted into any of the first positioning slots 14c to lock the head support 32 at a specified height; in this embodiment, the number of the first positioning slots 14c is six, the head support assembly 3 can be adjusted in six positions comprising the predetermined position when in the first usage state. When the child safety seat is in the second usage state, each second positioning slot 14d is aligned with the corresponding third positioning slot 15c, the positioning lock pin 323 is inserted into any second positioning slot 14d and the corresponding third positioning slot 15c, and the head support 32 is locked at a specified height; in this embodiment, the number of the second positioning slots 14d and the third positioning slots 15c are five, respectively, and the head support assembly 3 can be adjusted in five positions in the first usage state.

The head support assembly 3 also comprises an adjustment handle 33 that can slide up and down, the lower part of the adjustment handle 33 is provided with a pair of adjustment tilted slots 331, the pair of adjustment tilted slots 331 are disposed symmetrically to the left and right, and the distance between the upper ends of the two is smaller than that between the lower ends. The positioning lock pin 323 has a protrusion 323a slidably inserted in the adjustment tilted slot 331. Pull up the adjustment handle 33, the protrusion 323a enters the lower end portion of the adjustment tilted slot 331, and under the action of the wall of the adjustment tilted slot 331, the positioning lock pin 323 retracts into the second mounting slot, thereby disengaging from the first positioning slot 14c or the second positioning slot 14d and the third positioning slot 15c, realizing the unlocking of the head support 32, and the head support 32 can be adjusted up and down. A fourth elastic element 324 for inserting the positioning lock pin 323 into the first positioning slot 14c or into the second positioning slot 14d and the third positioning slot 15c is provided between the positioning lock pin 323 and the wall of the second mounting slot, and the fourth elastic element 324 is specifically a compression spring disposed on the wall of the second mounting slot and the positioning lock pin 323.

Figure 11:
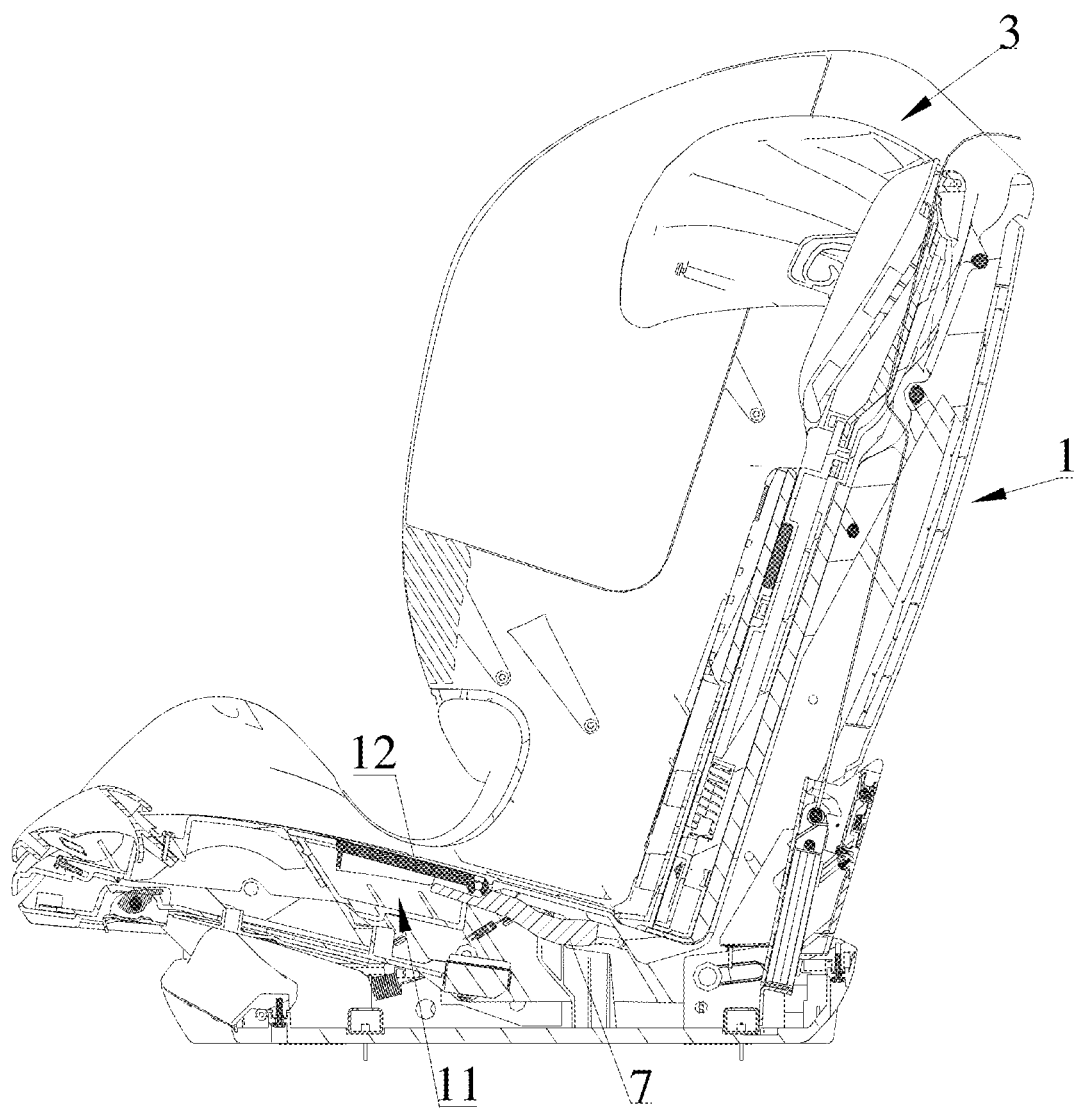
FIGS. 11-13 are cross-sectional views of the child safety seat of FIG. 9 in the first usage state along the front-and-rear direction.
Figure 12:
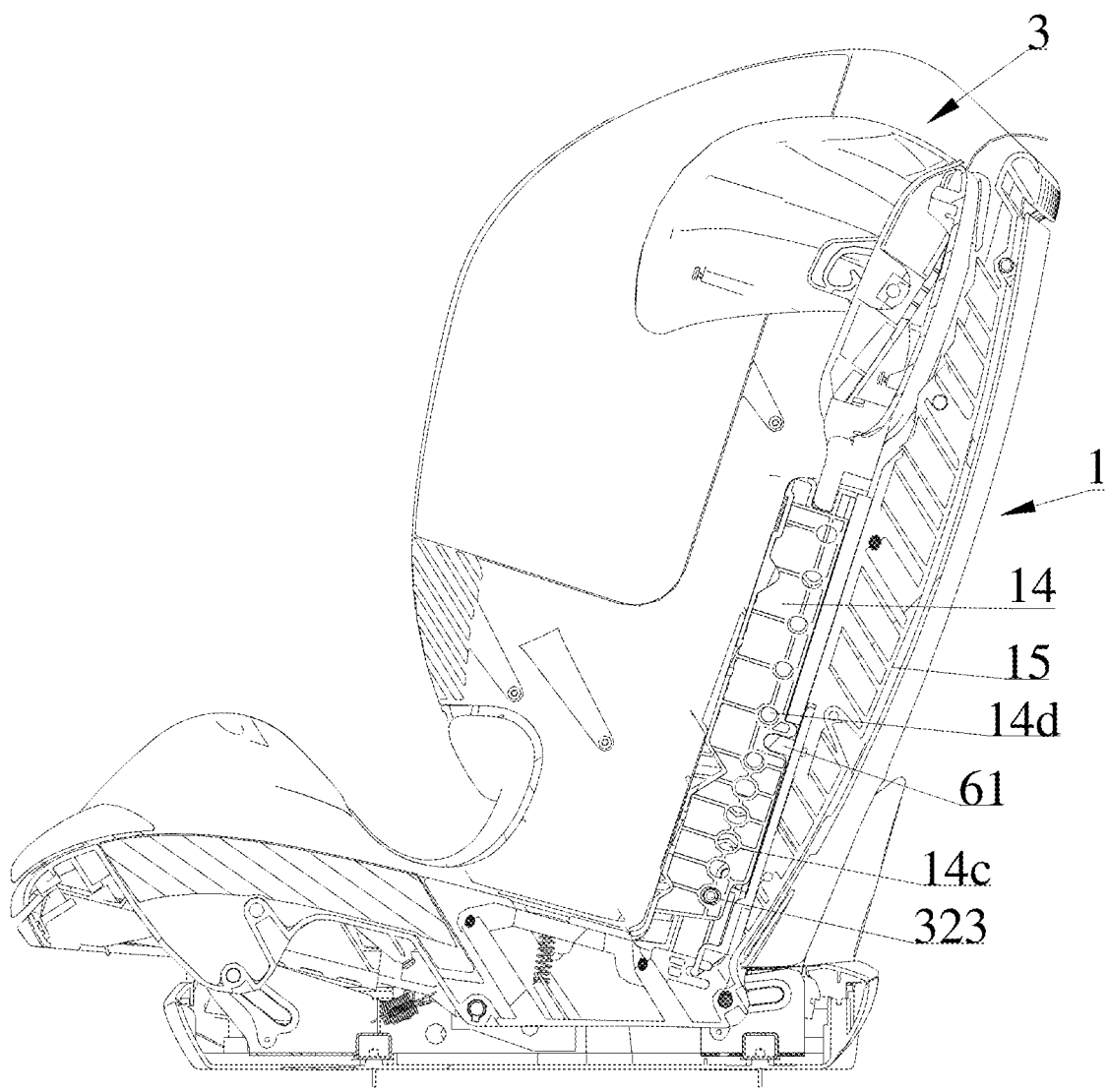
Figure 14:
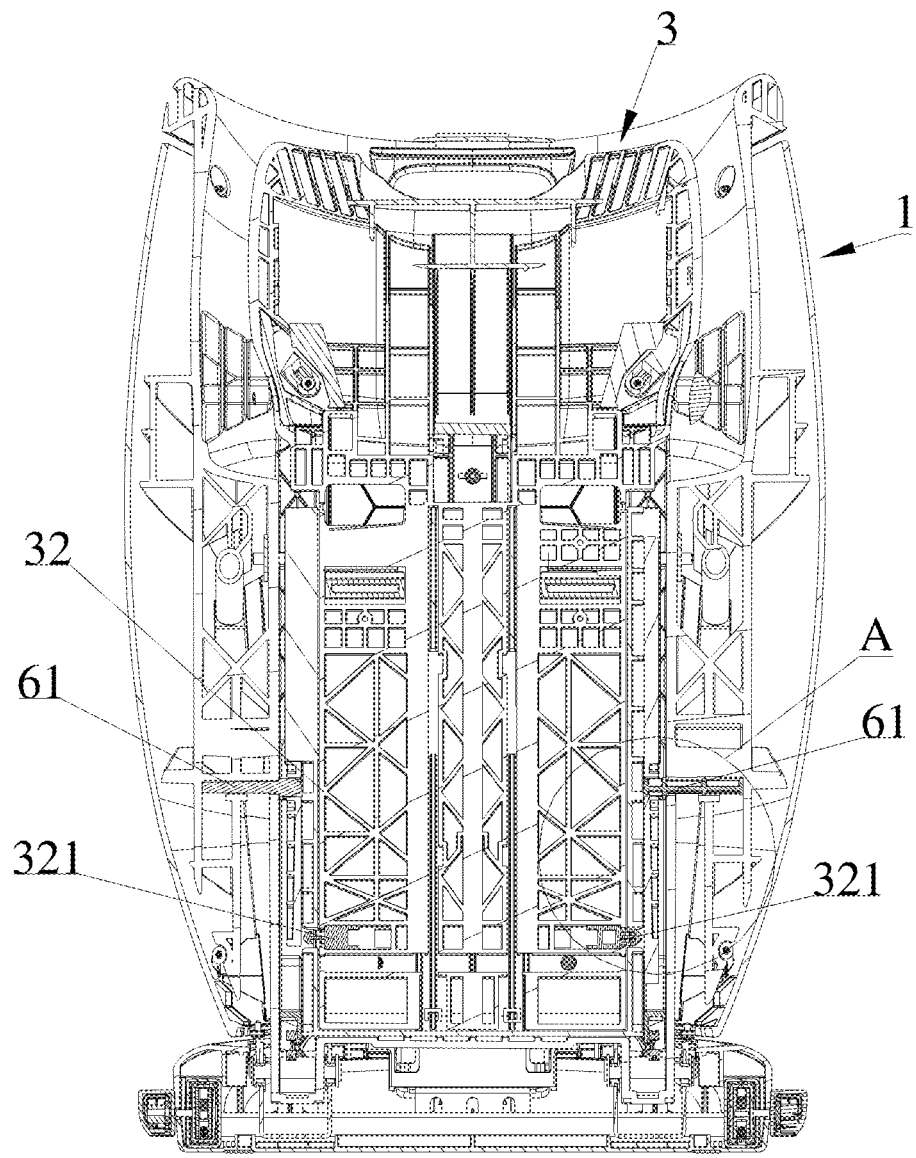
FIG. 14 is a cross-sectional view of the child safety seat of FIG. 9 in the first usage state along the left-and-right direction.
Figure 15:
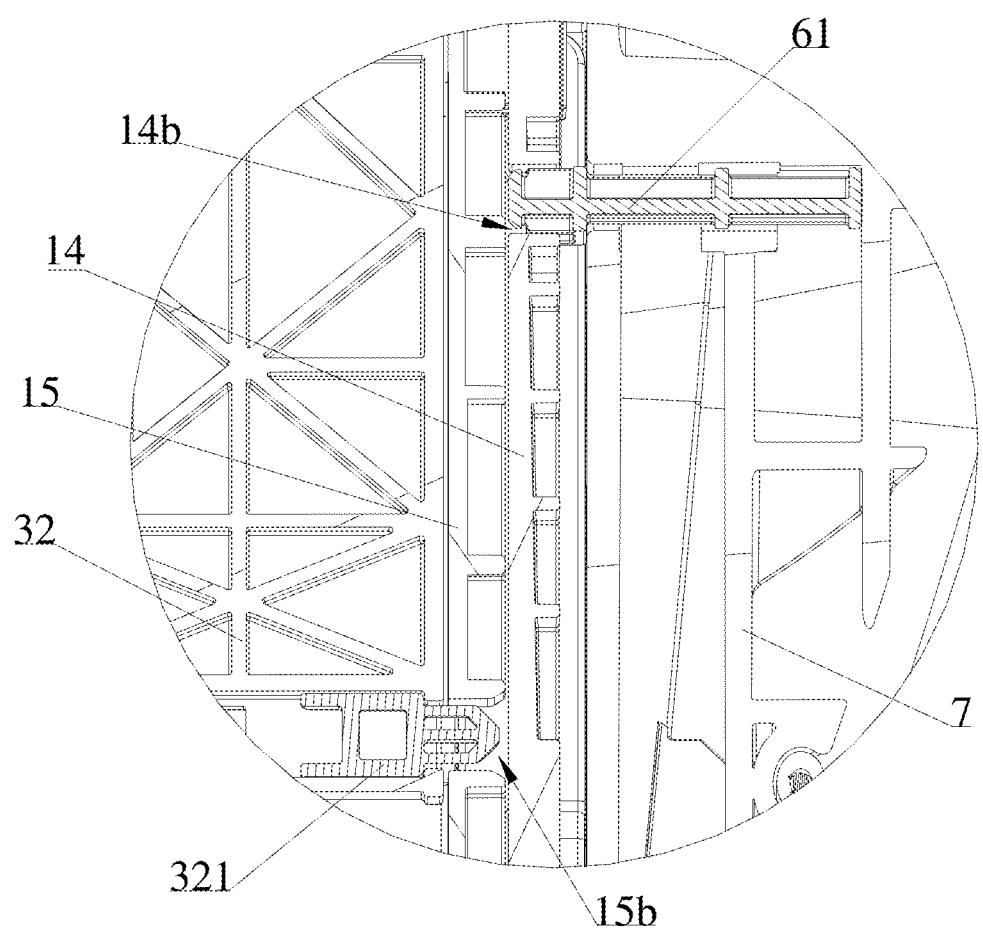
FIG. 15 is a partial enlarged view of Part A in FIG. 14.
Figure 16:
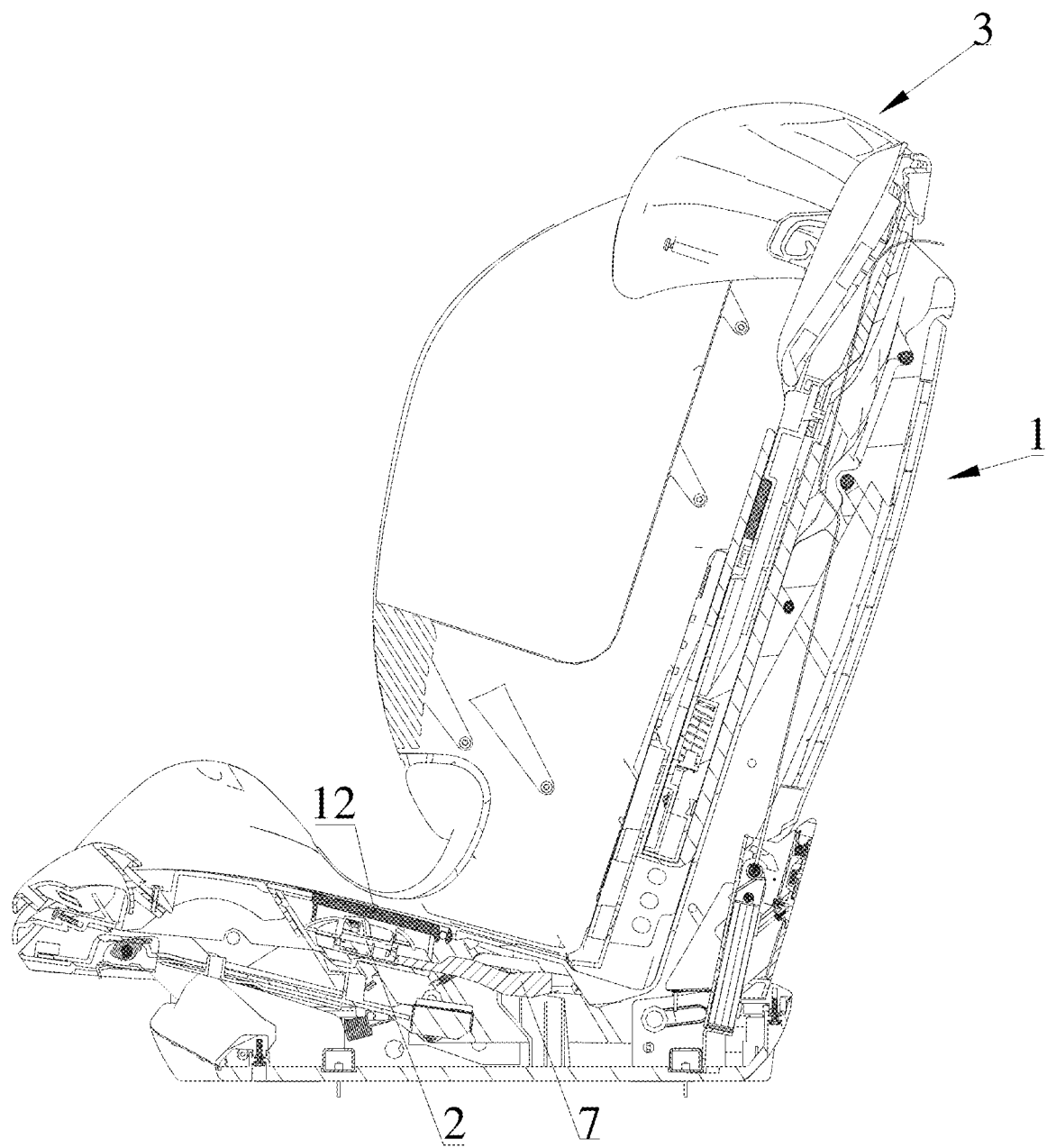
FIGS. 16 and 17 are cross-sectional views of the child safety seat of FIG. 9 in the second usage state along the front-and-rear direction.
Figure 17:
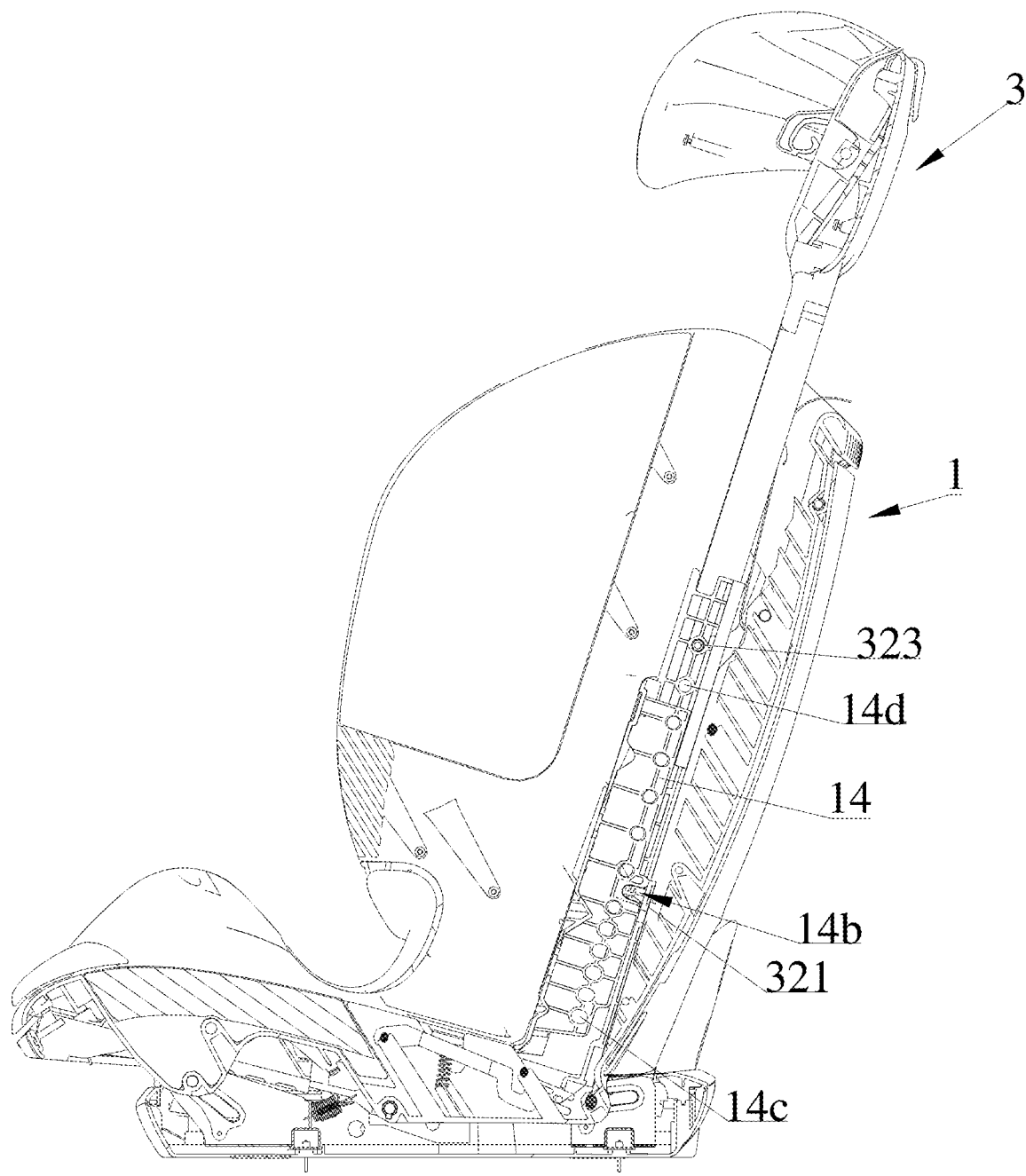

A safety seat suitable for children with 0-36 Kg is taken as an example to describe the use process of the child safety seat of the present disclosure. For infants of 0-18 Kg, the child safety seat needs to be converted to the first usage state, the seat belt buckle 2 is normally on the seat body, and the five-point safety belt is used to restrain infants, as shown in FIGS. 11-17. In FIGS. 11 and 12, the head support assembly 3 is in the lowest position, and the positioning lock pin 323 is inserted in the lowest first positioning slot 14c; in FIG. 13, the head support assembly 3 is in the predetermined position, and the positioning lock pin 323 is inserted into the uppermost first positioning slot 14c. As shown in FIGS. 14 and 15, in the first usage state, the second lock pin 61 is only inserted in the outer lock slot 14b, the inner plate cover lock pin 321 is inserted in the inner lock slot 15b, and the inner plate cover 15 moves along with the head support assembly 3, and the head support assembly 3 can move up to the predetermined position at most, that is, the height of the head support assembly 3 can only be at the lowest position shown in FIGS. 11 and 12, the predetermined position shown in FIG. 13, or between the two. For older children of 15-36 Kg, the child safety seat needs to be converted to the second usage state, as shown in FIGS. 16-17, in the second usage state, the child is restrained by the vehicle belt and the five-point safety belt cannot be used, the seat belt buckle 2 must be put into the storage slot 11, and the storage slot cover 12 should be buckled to prevent misuse of the five-point safety belt; the lower end portion of the unlocking member 7 is pressed by the seat belt buckle 2 and moves downward, the second lock pin 61 is inserted into the inner lock slot 15b and the outer lock slot 14b to connect the inner plate cover 15 and the outer plate cover 14 (as shown in FIGS. 18 and 19), the inner plate cover lock pin 321 is disengaged from the inner lock slot 15b so that the head support assembly 3 moves relative to the inner plate cover 15 and the outer plate cover 14, and the height of the head support assembly 3 is adjusted to above the predetermined position.

The embodiments described above are only for illustrating the technical concepts and features of the present disclosure, are preferred implementations, and are intended to make those skilled in the art being able to understand the present disclosure and thereby implement it, and should not be concluded to limit the protective scope of this disclosure.

What is claimed is:

1. A child safety seat, comprising a seat body and a five-point safety belt disposed on the seat body, the seat body comprising a housing, the five-point safety belt comprising a safety belt buckle, the housing being internally provided with a storage slot used for storing the safety belt buckle;
    wherein the seat body further comprises a head support assembly disposed on the housing in a sliding up and down manner, the head support assembly has a predetermined position, and when the safety belt buckle is placed in the storage slot, the head support assembly is allowed to be higher than the predetermined position, and the head support assembly cannot be higher than the predetermined position when the safety belt buckle is not in the storage slot.

2. The child safety seat according to claim 1, wherein the child safety seat has a first usage state and a second usage state,
    in the first usage state, the head support assembly is not higher than the predetermined position, and the safety belt buckle is located outside the storage slot all the time to allow the use of the five-point safety belt; or, the safety belt buckle is located outside the storage slot only when the head support assembly is lower than the predetermined position, and the safety belt buckle is able to be put into the storage slot when the head support assembly is located in the predetermined position;
    in the second usage state, the safety belt buckle is located in the storage slot, and the head support assembly is higher than the predetermined position.

3. The child safety seat according to claim 2, wherein the seat body further comprises a position-limit mechanism for preventing the head support assembly from being higher than the predetermined position and an unlocking member for releasing the position limit of the head support assembly and the position-limit mechanism, and the unlocking member is slidably disposed on the housing and one end of the unlocking member is movably disposed in the storage slot; when the child safety seat is converted from the first usage state to the second usage state, the seat belt buckle enters the storage slot and presses the one end of the unlocking member to release the position limit of the head support assembly and the position-limit mechanism.

4. The child safety seat according to claim 3, wherein the unlocking member is disposed on the housing in a sliding up and down manner, and a lower end portion of the unlocking member is movably disposed in the storage slot.

5. The child safety seat according to claim 4, wherein the head support assembly comprises a head support fixed part, and the head support fixed part is formed with a position-limit face facing upward thereon;
    the position-limit mechanism comprises a first lock pin seat disposed on the housing in a sliding left and right manner, the first lock pin seat is provided with a first lock pin cooperating with the position-limit face, and the head support assembly is in the predetermined position when the first lock pin pushes against the position-limit face;
    the unlocking member is in contact with the first lock pin seat and at least one of the components is provided with an unlocking slope that contacts and cooperates with the other component, and the unlocking slope gradually is tilted upward or downward from left to right;
    when the child safety seat is in the first usage state, the first lock pin is located directly above the position-limit face or pushes against the position-limit face; when the child safety seat is in the second usage state, the first lock pin is located on the left or right side of the position-limit face to disengage from the position-limit face.

6. The child safety seat according to claim 5, wherein the head support fixed part is opened with a first guide slot thereon, the first guide slot extends along a up-and-down direction, the position-limit face is formed on a lower wall of the first guide slot, and a left or right wall of the first guide slot is opened with a gap for the first lock pin to go in and out; when the child safety seat is in the first usage state, the first lock pin is slidably inserted in the first guide slot; when the child safety seat is in the second usage state, the first lock pin is located outside the first guide slot.

7. The child safety seat according to claim 6, wherein the head support fixed part is further opened with a second guide slot thereon, the second guide slot is in communication with the first guide slot via the gap; when the child safety seat is in the second usage state, the first lock pin is slidably inserted in the second guide slot or located directly under the second guide slot.

8. The child safety seat according to claim 6, wherein, between the housing and the unlocking member is provided a third elastic element for driving the unlocking member to move upward.

9. The child safety seat according to claim 5, wherein the position-limit mechanism further comprises a first elastic element disposed between the housing and the first lock pin seat.

10. The child safety seat according to claim 4, wherein the housing comprises an outer plate cover and an inner plate cover capable of sliding relative to the outer plate cover, the position-limit mechanism comprises a first position-limit portion formed on the inner plate cover and a second position-limit portion formed on the outer plate cover, the first position-limit portion is located directly under the second position-limit portion, and when the head support assembly is in the predetermined position, the first position-limit portion pushes against the second position-limit portion;
    the seat body further comprises a second lock pin, the second lock pin is disposed on a second lock pin seat, the unlocking member is in contact with the second lock pin seat and at least one of the components is provided with an unlocking slope that contacts and cooperates with the other component, and the unlocking slope gradually is tilted upward or downward from left to right;

the outer plate cover is provided with an outer locking slot into which the second lock pin is inserted, and the inner plate cover is provided with an inner locking slot into which the second lock pin is inserted;

the head support assembly comprises a head support and an inner plate cover lock pin capable of inserting into the inner locking slot;

when the child safety seat is in the first usage state, the inner plate cover lock pin is inserted into the inner locking slot, the head support assembly and the inner plate cover are connected to slide with respect to the outer plate cover synchronously; when the child safety seat is in the second usage state, the second lock pin is inserted into the inner locking slot and the outer locking slot, so that the inner plate cover and the outer plater cover are connected and the inner plate cover lock pin is pushed out of the inner locking slot, and the head support assembly is disengaged from the inner plate cover so as to slide up and down with respect to the inner plate cover and the outer plate cover.

11. The child safety seat according to claim 10, wherein, between the housing and the unlocking member is provided a third elastic element for driving the unlocking member to move upward.

12. The child safety seat according to claim 10, wherein an upper end portion of the unlocking member is provided with an unlocking tilted slot, the second lock pin seat is slidably inserted in the unlocking tilted slot, and the unlocking slope is formed on a wall of the unlocking tilted slot.

13. The child safety seat according to claim 12, wherein the number of the second lock pin is two and they are disposed at intervals on the left and right, the inner plate cover and the outer plate cover are disposed between the two second lock pins, and a distance between upper ends of the unlocking tilted slots on the left and right sides is smaller than that between the lower ends thereof.

14. The child safety seat according to claim 10, wherein the head support is provided with a first mounting slot, the inner plate cover lock pin is slidably disposed in the first mounting slot, and a wall of the first mounting slot and the inner plate cover is provided with a second elastic element therebetween for inserting the inner plate cover lock pin into the inner lock slot.

15. The child safety seat according to claim 10, wherein the first position-limit portion and the second position-limit portion are respectively protrusions.

16. The child safety seat according to claim 10, wherein a second mounting slot is provided on the head support, the second mounting slot is provided therein with a position lock pin capable of sliding left and right, a lower portion of the outer plate cover is provided with a plurality of first positioning slots spaced up and down, an upper portion of the outer plate cover is provided with a plurality of second positioning slots spaced up and down, the inner plate cover is provided with a plurality of third positioning slots spaced up and down, and the second positioning slots and the third positioning slots correspond one to one; when the child safety seat is in the first usage state, the positioning lock pin is inserted into any of the first positioning slots; when the child safety seat is in the second usage state, the second positioning slots are aligned with the corresponding third positioning slots, and the positioning lock pin is inserted into any of the second positioning slots and the corresponding third positioning slot.

17. The child safety seat according to claim 16, wherein the head support assembly further comprises an adjustment handle capable of sliding up and down, a lower portion of the adjustment handle is provided with an adjustment tilted slot, and the positioning lock pin is provided with a protrusion slidably inserted in the adjustment tilted slot.

18. The child safety seat according to claim 4, wherein between the housing and the unlocking member is provided a third elastic element for driving the unlocking member to move upward.

* * * * *

UNITED STATES PATENT AND TRADEMARK OFFICE
CERTIFICATE OF CORRECTION

PATENT NO. : 11,413,992 B2  
APPLICATION NO. : 17/273145  
DATED : August 16, 2022  
INVENTOR(S) : Youcai Zhang Page 1 of 1

It is certified that error appears in the above-identified patent and that said Letters Patent is hereby corrected as shown below:

On the Title Page

Item [54], delete "SAFELY" and insert -- SAFETY --.

In the Specification

Column 1, Line 1, delete "SAFELY" and insert -- SAFETY --.

Signed and Sealed this  
Twenty-second Day of November, 2022

Katherine Kelly Vidal  
*Director of the United States Patent and Trademark Office*